US012706787B2

(12) United States Patent
Li et al.

(10) Patent No.: US 12,706,787 B2
(45) **Date of Patent: *Aug. 11, 2026**

(54) EQUALIZATION TRAINING METHOD AND APPARATUS, AND SYSTEM

(71) Applicant: HUAWEI TECHNOLOGIES CO., LTD., Shenzhen (CN)

(72) Inventors: Yongyao Li, Shenzhen (CN); Fei Luo, Chengdu (CN); Jiang Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,900

(22) Filed: Aug. 21, 2024

(65) Prior Publication Data

US 2024/0414032 A1 Dec. 12, 2024

Related U.S. Application Data

(63) Continuation of application No. 18/070,986, filed on Nov. 29, 2022, now Pat. No. 12,095,597, which is a (Continued)

(30) Foreign Application Priority Data

May 30, 2020 (CN) ........................ 202010480695.3

(51) Int. Cl.
*H04L 25/03* (2006.01)

(52) U.S. Cl.
CPC .............................. *H04L 25/03885* (2013.01)

(58) Field of Classification Search
CPC ................................................ H04L 25/03885
See application file for complete search history.

(56) References Cited

U.S. PATENT DOCUMENTS 10,958,413 B2 3/2021 Li et al.
11,347,669 B2 5/2022 Li et al.
(Continued)

FOREIGN PATENT DOCUMENTS

CN 108920173 A 11/2018
WO 2019242376 A1 12/2019

OTHER PUBLICATIONS

PCI, PCI Express Base Specification Revision 4.0 Version 0.3 Feb. 19, 2014, 1053 pages.

*Primary Examiner* — Henry Tsai
*Assistant Examiner* — Christopher A Daley
(74) *Attorney, Agent, or Firm* — WOMBLE BOND DICKINSON (US) LLP

(57) ABSTRACT

An equalization training method and apparatus are described. The method includes obtaining a training rate of each of a master chip and a slave chip in a target phase of equalization training. The method also includes determining a target rate threshold interval within which the training rate in the target phase falls, determining, based on a correspondence between N+1 rate threshold intervals and N+1 equalization timeout periods, a target equalization timeout period corresponding to the target rate threshold interval, and configuring the target equalization timeout period as an equalization timeout period in the target phase. Accordingly, an equalization timeout period used for equalization training can be configured for each equalization training process, so that the configured equalization timeout period better conforms to a training rate currently used for link negotiation, to ensure that an equalization parameter is found within the configured equalization timeout period, improving an equalization training success rate.

14 Claims, 11 Drawing Sheets

Related U.S. Application Data continuation of application No. PCT/CN2021/076554, filed on Feb. 10, 2021.

(56) References Cited

U.S. PATENT DOCUMENTS

| | | | |
|---|---|---|---|
| 11,496,340 | B2 | 11/2022 | Li et al. |
| 11,799,697 | B2 | 10/2023 | Li et al. |
| 11,863,357 | B2 | 1/2024 | Mcloughlin |
| 11,921,660 | B2 | 3/2024 | Li et al. |
| 2014/0281067 | A1 | 9/2014 | Das Sharma et al. |
| 2017/0371831 | A1 | 12/2017 | Das Sharma |
| 2018/0004686 | A1 | 1/2018 | Chen |
| 2019/0034376 | A1 | 1/2019 | Das Sharma |
| 2022/0292035 | A1 | 9/2022 | Li et al. |
| 2023/0094563 | A1 | 3/2023 | Li et al. |
| 2024/0064216 | A1 | 2/2024 | Lusted |

EQUALIZATION TRAINING METHOD AND APPARATUS, AND SYSTEM

CROSS-REFERENCE TO RELATED APPLICATIONS

This application is a continuation of U.S. patent application Ser. No. 18/070,986, filed on Nov. 29, 2022, which is a continuation of International Application No. PCT/CN2021/076554, filed on Feb. 10, 2021, which claims priority to Chinese Patent Application No. 202010480695.3, filed on May 30, 2020. All of the afore-mentioned patent applications are hereby incorporated by reference in their entireties.

TECHNICAL FIELD

This application relates to the field of chip technologies, and in particular, to an equalization training method and apparatus, and a system.

BACKGROUND

A peripheral component interconnect express (PCIe) is a computer expansion bus standard. A PCIe bus is usually used in a processor that needs to perform high-speed data transmission, for example, a computer system, a server, a memory, or a mobile phone, to connect to a peripheral device. PCIe specifies that a communications system (for example, link negotiation between a master chip and a slave chip) first performs link negotiation after being powered on, and establishes a high-speed link only after negotiation succeeds, to transmit and receive service data. From PCIe 3.0, during link negotiation, an equalization training mechanism is provided to compensate for a signal quality problem caused by a link loss.

The equalization training mechanism includes a total of four phases: an equalization training phase 1 to an equalization training phase 4 (Phase 0 to Phase 3). Currently, a fixed equalization timeout period is specified in each phase of equalization training. For example, a maximum time limit of equalization timeout periods specified in Phase 2 and Phase 3 is usually 32 milliseconds (ms). If equalization training is not completed within a specified equalization timeout period, the communications system triggers timeout, and announces a link equalization failure.

However, with a rapid increase in a communication rate, when communication transmission is performed on a higher-speed link, the communications system requires a more complex equalization circuit structure and a larger quantity of equalization parameters. In other words, in this case, in a phase of equalization training, it needs to take more time to determine an equalization parameter, even far more than an equalization timeout period whose maximum time limit is 32 ms and that is currently specified in a PCIe protocol. Therefore, when communication transmission is performed on a higher-speed link, a link negotiation success rate is low.

In conclusion, a current equalization training method is not flexible enough, and cannot be applied to negotiation on the higher-speed link.

SUMMARY

This application provides an equalization training method, to perform equalization training more flexibly, and improve a high-speed link negotiation success rate. Further, this application further provides an apparatus and a system for performing the method, and a chip used in performing the method.

According to a first aspect, an embodiment of this application provides an equalization training method, and the method includes the following operations:

obtaining a training rate of each of a master chip and a slave chip in a target phase of equalization training, where the target phase is a third phase or a fourth phase; and determining a target rate threshold interval within which the training rate in the target phase falls, determining, based on a correspondence between N+1 rate threshold intervals and N+1 equalization timeout periods, a target equalization timeout period corresponding to the target rate threshold interval, and configuring the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

Based on this solution, in this embodiment of this application, an equalization timeout period used for equalization training can be flexibly configured for each phase of equalization training, so that the configured equalization timeout period better conforms to a training rate currently used for negotiation. It is learned that in each phase of equalization, if an equalization operation of a chip cannot be completed within the equalization timeout period, the chip exits equalization, resulting in a failure of link negotiation between the chip and a peer chip. However, in this application, an equalization timeout period configured in a phase of equalization training is determined based on a training rate in the phase of equalization training. Therefore, plenty of equalization timeout periods are configured in the phase of equalization training, so that it can be better ensured that an operation in the phase of equalization training is smoothly completed and the chip does not exit equalization training due to insufficient time. Therefore, according to the method provided in this application, a link negotiation success rate can be improved to some extent.

It should be noted that when the chip is a master chip, the peer chip is a slave chip, and when the chip is a slave chip, the peer chip is a master chip.

In some embodiments, the master chip and the slave chip are connected to each other through a PCIe bus or a cache coherent interconnect for accelerators (CCIX) bus. It can be learned that the equalization training method provided in this embodiment is applied to a processor system in which the PCIe bus or the CCIX bus is used.

In some embodiments, in the processor system to which the PCIe bus is applied, the master chip is a root complex (RC) or a switch chip, and the slave chip is an endpoint device (endpoint) independent of the master chip. It should be learned that, the switch chip may be a master chip in some cases, or may be a slave chip in other cases.

With reference to the first aspect, in a possible embodiment, when the target rate threshold interval is a threshold interval including a minimum rate in the N+1 rate threshold intervals, the target equalization timeout period is a forward compatible equalization timeout period.

Based on this solution, in this embodiment of this application, when it is determined that the target rate threshold interval within which the training rate in the target phase falls is a minimum threshold interval, the target equalization timeout period is set to the forward compatible equalization timeout period. There is no need to search, based on the correspondence between the N+1 rate threshold intervals and the N+1 equalization timeout periods, for the equalization timeout period corresponding to the training rate in the target phase, thereby better reducing system overheads.

For example, a forward compatible equalization timeout period specified in PCIe 3.0 to PCIe 5.0 is 32 ms.

With reference to the first aspect, in a possible embodiment, the correspondence between the N+1 rate threshold intervals and the N+1 equalization timeout periods is prestored in a register of the master chip or in a register of the slave chip.

Based on this solution, the correspondence between the N+1 rate threshold intervals and the N+1 equalization timeout periods is prestored in the register of the master chip or in the register of the slave chip, so that the correspondence between the N+1 rate threshold intervals and the N+1 equalization timeout periods may be directly read from a register of a corresponding chip for use, to save time.

With reference to the first aspect, in a possible embodiment, before the obtaining a training rate of each of a master chip and a slave chip in a target phase of equalization training, it is determined not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

Based on this solution, this embodiment of this application further provides the fast equalization training mode. To be specific, if the fast equalization training mode is selected before the target phase of the current round of equalization training, the sending parameter and the receiving parameter in the target phase of the previous round of equalization training are separately configured as the initial parameters of the master chip and the slave chip in the target phase of the current round of equalization training. The equalization training method is optimized. In addition, because the fast equalization training mode is used, complexity of obtaining an equalization parameter can be effectively reduced, and time for obtaining the equalization parameter can be effectively shortened, thereby better ensuring that the operation in the phase of equalization training is smoothly completed and the chips do not exit the operation due to insufficient time. The link negotiation success rate is improved to some extent.

With reference to the first aspect, in a possible embodiment, after equalization training in the target phase of the current round of equalization training is completed, an equalization parameter of the master chip in the target phase of the current round of equalization training is stored in a register of the master chip, and an equalization parameter of the slave chip in the target phase of the current round of equalization training is stored in a register of the slave chip; or equalization parameters of the master chip and the slave chip in the target phase of the current round of equalization training are stored in a register of the master chip; or equalization parameters of the master chip and the slave chip in the target phase of the current round of equalization training are stored in a register of the slave chip.

Based on this solution, after equalization training in the target phase of the current round of equalization training is completed, the equalization parameter of the master chip in the target phase of the current round of equalization training is stored, and the equalization parameter of the slave chip in the target phase of the current round of equalization training is stored. Therefore, in a target phase of a next round of equalization training, the sending parameter and the receiving parameter that are prestored by the master chip and the slave chip may be directly obtained, to determine the initial parameters, thereby saving time.

With reference to the first aspect, in a possible embodiment, before it is determined not to use the fast equalization training mode, a negotiation sequence that is of the master chip and the slave chip and that is used for the target phase of equalization training is obtained; and that a bit value specified in the negotiation sequence corresponds to a non-fast equalization training mode is determined based on a correspondence between a bit value specified in the negotiation sequence and an equalization training mode.

Based on this solution, this embodiment of this application provides a method for determining whether to use an equalization training mode. To be specific, whether to use an equalization training mode is determined based on the bit value specified in the negotiation sequence used for the target phase of equalization training, to optimize an equalization training method.

According to a second aspect, an embodiment of this application further provides an equalization training method, and the method includes the following operations:

determining whether to use a fast equalization training mode; when it is determined to use the fast equalization training mode, obtaining a sending parameter and a receiving parameter of each of a master chip and a slave chip in a target phase of a previous round of equalization training, and respectively configuring the sending parameter and the receiving parameter as initial parameters of the master chip and the slave chip in a target phase of a current round of equalization training, where a target phase of equalization training is a third phase or a fourth phase of the equalization training; obtaining a forward compatible equalization timeout period in the target phase of equalization training, and configuring the forward compatible equalization timeout period as an equalization timeout period in the target phase of the current round of equalization training; and performing, within the equalization timeout period in the target phase of the current round of equalization training, equalization training by using the initial parameters of the master chip and the slave chip in the target phase of the current round of equalization training.

Based on this solution, in this embodiment of this application, in the target phase of the current equalization training, the sending parameter and the receiving parameter of each of the master chip and the slave chip in the target phase of the previous round of equalization training are obtained, and the sending parameter and the receiving parameter are respectively configured as initial parameters of the master chip and the slave chip in the target phase of the current round of equalization training. The equalization training method is optimized, to help obtain an equalization parameter in a phase of the current round of equalization training more quickly. There is greater applicability and higher efficiency. In addition, because the fast equalization training mode is used, complexity of obtaining the equalization parameter can be effectively reduced, and time for obtaining the equalization parameter can be effectively shortened, thereby better ensuring that an operation in the phase of equalization training is smoothly completed and the chips do not exit the operation due to insufficient time. A link negotiation success rate is improved to some extent.

It should be noted that when the chip is a master chip, the peer chip is a slave chip, and when the chip is a slave chip, the peer chip is a master chip.

In some embodiments, the master chip and the slave chip are connected to each other through a PCIe bus or a CCIX bus. It can be learned that the equalization training method provided in this embodiment is applied to a processor system in which the PCIe bus or the CCIX bus is used.

In some embodiments, in the processor system to which the PCIe bus is applied, the master chip is a root complex (RC,) or a switch chip, and the slave chip is an endpoint device (endpoint) independent of the master chip. It should be learned that, the switch chip may be a master chip in some cases, or may be a slave chip in other cases.

With reference to the second aspect, in a possible embodiment, the fast equalization training mode is a mode in which the initial parameters of the master chip and the slave chip in the target phase of the current round of equalization training are separately configured based on the sending parameter and the receiving parameter in the target phase of the previous round of equalization training. Based on this solution, this embodiment of this application further provides the fast equalization training mode. To be specific, after it is determined to use the fast equalization training mode, the initial parameters of the master chip and the slave chip in the target phase of the current round of equalization training are separately configured based on the sending parameter and the receiving parameter in the target phase of the previous round of equalization training. The equalization training method is optimized, to help obtain the equalization parameter in the phase of the current round of equalization training more quickly.

With reference to the second aspect, in a possible embodiment, after equalization training in the target phase of the current round of equalization training is completed, an equalization parameter of the master chip in the target phase of the current round of equalization training is stored in a register of the master chip, and an equalization parameter of the slave chip in the target phase of the current round of equalization training is stored in a register of the slave chip; or equalization parameters of the master chip and the slave chip in the target phase of the current round of equalization training are stored in a register of the master chip; or equalization parameters of the master chip and the slave chip in the target phase of the current round of equalization training are stored in a register of the slave chip.

Based on this solution, after equalization training in the target phase of the current round of equalization training is completed, the equalization parameter of the master chip in the target phase of the current round of equalization training is stored, and the equalization parameter of the slave chip in the target phase of the current round of equalization training is stored. Therefore, in a target phase of a next round of equalization training, the sending parameter and the receiving parameter that are prestored by the master chip and the slave chip may be directly obtained, to determine the initial parameters, thereby saving time.

With reference to the second aspect, in a possible embodiment, before it is determined to use the fast equalization training mode, a negotiation sequence that is of the master chip and the slave chip and that is used for the target phase of equalization training is obtained; and that a bit value specified in the negotiation sequence corresponds to a non-fast equalization training mode is determined based on a correspondence between a bit value specified in the negotiation sequence and an equalization training mode.

Based on this solution, this embodiment of this application provides a method for determining whether to use an equalization training mode. To be specific, whether to use an equalization training mode is determined based on the bit value specified in the negotiation sequence used for the target phase of equalization training, to optimize an equalization training method.

According to a third aspect, this application provides an equalization training apparatus. The apparatus is configured to perform the method according to any one of the first aspect or the embodiments of the first aspect. The apparatus includes a transceiver and a manager.

The transceiver is configured to obtain a training rate of each of a master chip and a slave chip in a target phase of equalization training, where the target phase is a third phase or a fourth phase. Correspondingly, the manager is configured to: determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

The apparatus provided in this embodiment can be used to implement the equalization training method according to any one of the first aspect or the possible embodiments of the first aspect. It can be learned that when the apparatus provided in this embodiment is used, the master chip has plenty of equalization timeout periods in the third phase of the equalization, and correspondingly, the master chip does not exit an equalization operation in the third phase due to insufficient time; and the slave chip also has plenty of equalization timeout periods in the fourth phase of the equalization, and correspondingly, the slave chip does not exit an equalization operation in the fourth phase due to insufficient time. Therefore, according to the apparatus provided in this embodiment, a probability that a chip exits an equalization operation due to insufficient equalization timeout periods can be reduced to some extent, to effectively improve the link negotiation success rate.

With reference to the third aspect, in a possible embodiment, when the target rate threshold interval is a threshold interval including a minimum rate in the N+1 rate threshold intervals, the target equalization timeout period is a forward compatible equalization timeout period.

For beneficial effects of this solution, refer to beneficial effects corresponding to a related embodiment of the first aspect, and details are not described herein again.

As described above, a forward compatible equalization timeout period of PCIe 3.0 to PCIe 5.0 is 32 ms.

With reference to the third aspect, in a possible embodiment, the correspondence between the N+1 rate threshold intervals and the N+1 equalization timeout periods is prestored in a register of the master chip or in a register of the slave chip.

With reference to the third aspect, in a possible embodiment, before the training rate of each of the master chip and the slave chip in the target phase of equalization training is obtained, the manager is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

For beneficial effects of this solution, refer to beneficial effects corresponding to a related embodiment of the first aspect, and details are not described herein again.

With reference to the third aspect, in a possible embodiment, after equalization training in the target phase of the current round of equalization training is completed, the manager is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

With reference to the third aspect, in a possible embodiment, the transceiver is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

For beneficial effects of this solution, refer to beneficial effects corresponding to a related embodiment of the first aspect, and details are not described herein again.

According to a fourth aspect, this application provides an equalization training apparatus. The apparatus is configured to perform the method according to any one of the second aspect or the embodiments of the second aspect. The apparatus includes a transceiver and a manager.

The manager is configured to determine whether to use a fast equalization training mode.

The transceiver is configured to: when it is determined to use the fast equalization training mode, obtain a sending parameter and a receiving parameter of each of a master chip and a slave chip in a target phase of a previous round of equalization training.

The manager is further configured to respectively configure the sending parameter and the receiving parameter as initial parameters of the master chip and the slave chip in a target phase of a current round of equalization training, where a target phase of equalization training is a third phase or a fourth phase of the equalization training.

The transceiver is further configured to obtain a forward compatible equalization timeout period in the target phase of equalization training.

The manager is further configured to configure the forward compatible equalization timeout period as an equalization timeout period in the target phase of the current round of equalization training.

The manager is further configured to perform, within the equalization timeout period in the target phase of the current round of equalization training, equalization training by using the initial parameters of the master chip and the slave chip in the target phase of the current round of equalization training.

The apparatus provided in this embodiment can be used to implement the equalization training method according to any one of the second aspect or the possible embodiments of the second aspect. It can be learned that, according to the apparatus provided in this embodiment, the initial parameters of the master chip and the slave chip in the target phase of the current round of equalization training can be configured more quickly. The equalization training method is optimized, to help obtain an equalization parameter in a phase of the current round of equalization training more quickly. There is greater applicability and higher efficiency. In addition, a probability of exiting due to insufficient time in the target phase of equalization training is effectively reduced, and a link negotiation success rate is improved.

With reference to the fourth aspect, in a possible embodiment, after equalization training in the target phase of the current round of equalization training is completed, the manager is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

For beneficial effects of this solution, refer to beneficial effects corresponding to a related embodiment of the second aspect, and details are not described herein again.

With reference to the fourth aspect, in a possible embodiment, before it is determined to use the fast equalization training mode, the transceiver is further configured to obtain a negotiation sequence that is of the master chip and the slave chip and that is used for the target phase of equalization training; and the manager is further configured to determine, based on a correspondence between a bit value specified in the negotiation sequence and an equalization training mode, that a bit value specified in the negotiation sequence corresponds to a non-fast equalization training mode.

For beneficial effects of this solution, refer to beneficial effects corresponding to a related embodiment of the second aspect, and details are not described herein again.

According to a fifth aspect, this application provides another equalization training apparatus. The apparatus is also configured to perform the equalization training method according to any one of the first aspect or the embodiments of the first aspect. The apparatus includes an obtaining unit, a determining unit, and a configuration unit.

The obtaining unit is configured to obtain a training rate of each of a master chip and a slave chip in a target phase of equalization training, where the target phase is a third phase or a fourth phase.

The determining unit is configured to: determine a target rate threshold interval within which the training rate in the target phase falls, and determine, based on a correspondence between N+1 rate threshold intervals and N+1 equalization timeout periods, a target equalization timeout period corresponding to the target rate threshold interval.

The configuration unit is configured to: configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

The apparatus provided in this embodiment is configured to perform the method according to any one of the first aspect or the possible embodiments of the first aspect. When the apparatus provided in this embodiment is used, the master chip has plenty of equalization timeout periods in the third phase of the equalization, and correspondingly, the master chip does not exit an equalization operation in the third phase due to insufficient time; and the slave chip also has plenty of equalization timeout periods in the fourth phase of equalization, and correspondingly, the slave chip does not exit an equalization operation in the fourth phase due to insufficient time. Therefore, according to the apparatus provided in this embodiment, a probability that a chip exits an equalization operation due to insufficient equalization timeout periods can be reduced to some extent, to effectively improve a link negotiation success rate.

With reference to the fifth aspect, in a possible embodiment, when the target rate threshold interval is a threshold interval including a minimum rate in the N+1 rate threshold intervals, the target equalization timeout period is a forward compatible equalization timeout period.

With reference to the fifth aspect, in a possible embodiment, the correspondence between the N+1 rate threshold intervals and the N+1 equalization timeout periods is prestored in a register of the master chip or in a register of the slave chip.

With reference to the fifth aspect, in a possible embodiment, before the training rate of each of the master chip and the slave chip in the target phase of equalization training is obtained, the determining unit is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

With reference to the fifth aspect, in a possible embodiment, the obtaining unit is further configured to: after equalization training in the target phase of the current round of equalization training is completed, store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

With reference to the fifth aspect, in a possible embodiment, the obtaining unit is further configured to obtain a negotiation sequence that is of the master chip and the slave chip and that is used for the target phase of equalization training; and the determining unit is further configured to determine, based on a correspondence between a bit value specified in the negotiation sequence and an equalization training mode, that a bit value specified in the negotiation sequence corresponds to a non-fast equalization training mode.

According to a sixth aspect, this application provides another equalization training apparatus. The apparatus is also configured to perform the equalization training method according to any one of the second aspect or the embodiments of the second aspect. The apparatus includes an obtaining unit, a determining unit, and a configuration unit.

The determining unit is configured to determine whether to use a fast equalization training mode.

The obtaining unit is configured to: when it is determined to use the fast equalization training mode, obtain a sending parameter and a receiving parameter of each of a master chip and a slave chip in a target phase of a previous round of equalization training.

The configuration unit is configured to respectively configure the sending parameter and the receiving parameter as initial parameters of the master chip and the slave chip in a target phase of a current round of equalization training, where a target phase of equalization training is a third phase or a fourth phase of the equalization training.

The obtaining unit is further configured to obtain a forward compatible equalization timeout period in the target phase of equalization training.

The configuration unit is further configured to: configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

The apparatus provided in this embodiment is configured to perform the method according to any one of the second aspect or the possible embodiments of the second aspect. According to the apparatus provided in this embodiment, the initial parameters in the target phase of the current round of equalization training can be configured for the master chip and the slave chip more quickly. The equalization training method is optimized, to help obtain an equalization parameter in a phase of the current round of equalization training more quickly. There is greater applicability and higher efficiency. In addition, a probability of exiting due to insufficient time in the target phase of equalization training is effectively reduced, and a link negotiation success rate is improved.

With reference to the sixth aspect, in a possible embodiment, the obtaining unit is further configured to: after equalization training in the target phase of the current round of equalization training is completed, store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

With reference to the sixth aspect, in a possible embodiment, before it is determined to use the fast equalization training mode, the obtaining unit is further configured to obtain a negotiation sequence that is of the master chip and the slave chip and that is used for the target phase of equalization training; and the determining unit is further configured to determine, based on a correspondence between a bit value specified in the negotiation sequence and an equalization training mode, that a bit value specified in the negotiation sequence corresponds to a non-fast equalization training mode.

According to a seventh aspect, this application provides still another equalization training apparatus. The apparatus is also configured to perform the equalization training method according to any one of the first aspect or the embodiments of the first aspect. The apparatus includes a central processing unit (CPU) and a memory. The CPU is configured to execute code stored in the memory, to implement functions of the apparatus described in this embodiment.

The memory is configured to store a correspondence between N+1 rate threshold intervals and N+1 equalization timeout periods. Correspondingly, the CPU is configured to obtain a training rate of each of a master chip and a slave chip in a target phase of equalization training. The target phase is a third phase or a fourth phase.

The CPU is further configured to: determine a target rate threshold interval within which the training rate in the target phase falls, determine, based on the correspondence between the N+1 rate threshold intervals and the N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

Similar to the apparatuses described in the foregoing embodiments, according to the apparatus described in this embodiment, a probability that a system exits an equalization operation due to insufficient equalization timeout periods, and consequently, a link negotiation failure is caused can be reduced to some extent.

According to an eighth aspect, this application provides still another equalization training apparatus. The apparatus is also configured to perform the equalization training method according to any one of the second aspect or the embodiments of the second aspect. The apparatus includes a central processing unit (CPU) and a memory. The CPU is configured to execute code stored in the memory, to implement functions of the apparatus described in this embodiment.

The memory is configured to store an equalization parameter in a target phase of a previous round of equalization training. Correspondingly, the CPU is configured to: determine whether to use a fast equalization training mode, and when determining to use the fast equalization training mode, obtain a sending parameter and a receiving parameter of each of a master chip and a slave chip in the target phase of the previous round of equalization training, and respectively configure the sending parameter and the receiving parameter as initial parameters of the master chip and the slave chip in a target phase of a current round of equalization training, where a target phase of equalization training is a third phase or a fourth phase of the equalization training.

The CPU is further configured to: obtain a forward compatible equalization timeout period in the target phase of equalization training, and configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

Similar to the apparatuses described in the foregoing embodiments, according to the apparatus described in this embodiment, a probability that a system exits an equalization operation due to insufficient equalization timeout periods, and consequently, a link negotiation failure is caused can be reduced to some extent.

According to a ninth aspect, this application provides a chip. The chip may be the master chip or the slave chip mentioned in any one of the first aspect or the embodiments of the first aspect, any one of the third aspect or the embodiments of the third aspect, or any one of the fifth aspect or the embodiments of the fifth aspect. The chip includes a register, a transceiver, and a manager.

The register is configured to store a correspondence between N+1 rate threshold intervals and N+1 equalization timeout periods.

The transceiver is configured to obtain a training rate of each of a master chip and a slave chip in a target phase of equalization training. The target phase is a third phase or a fourth phase.

The manager is configured to: determine a target rate threshold interval within which the training rate in the target phase falls, determine, based on the correspondence between the N+1 rate threshold intervals and the N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

The method according to any one of the first aspect or the possible embodiments of the first aspect can be implemented by applying the chip according to this embodiment, thereby reducing a risk of a link negotiation failure that occurs because a system exits an equalization operation because of equalization timeout period insufficiency.

With reference to the ninth aspect, in a possible embodiment, the register is further configured to store a forward compatible equalization timeout period.

With reference to the ninth aspect, in the possible embodiment, the register is further configured to store an equalization parameter in a target phase of a current round of equalization training.

Further, in this embodiment of this application, the chip has a function of enabling and disabling a part of an equalization circuit. When a fast equalization process is required, a part of the equalization circuit is disabled. For example, a DFE or a part of a CTLE is disabled, to shorten equalization time. The chip in this embodiment of this application is provided with management software, or is a state machine that meets a standard.

According to a tenth aspect, this application provides a chip. The chip may be the master chip or the slave chip mentioned in any one of the second aspect or the embodiments of the second aspect, any one of the fourth aspect or the embodiments of the fourth aspect, or any one of the sixth aspect or the embodiments of the sixth aspect. The chip includes a register, a transceiver, and a manager.

The register is configured to store an equalization parameter in a target phase of a current round of equalization training of the chip.

The manager is configured to determine whether to use a fast equalization training mode.

The transceiver is configured to: when it is determined to use the fast equalization training mode, obtain a sending parameter and a receiving parameter of each of a master chip and a slave chip in a target phase of a previous round of equalization training.

The manager is further configured to respectively configure the sending parameter and the receiving parameter as initial parameters of the master chip and the slave chip in a target phase of a current round of equalization training, where a target phase of equalization training is a third phase or a fourth phase of the equalization training.

The transceiver is further configured to obtain a forward compatible equalization timeout period in the target phase of equalization training.

The manager is further configured to: configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

The method according to any one of the second aspect or the possible embodiments of the second aspect can be implemented by applying the chip according to this embodiment, thereby reducing a risk of a link negotiation failure that occurs because a system exits an equalization operation because of equalization timeout period insufficiency.

With reference to the tenth aspect, in a possible embodiment, the register is further configured to store the equalization parameter in the target phase of the current round of equalization training.

With reference to the tenth aspect, in the possible embodiment, the register is further configured to store a correspondence between N+1 rate threshold intervals and N+1 equalization timeout periods.

Further, in this embodiment of this application, the chip has a function of enabling and disabling a part of an equalization circuit. When a fast equalization process is required, a part of the equalization circuit is disabled. For example, a DFE or a part of a CTLE is disabled, to shorten equalization time. The chip in this embodiment of this application is provided with management software, or is a state machine that meets a standard.

According to an eleventh aspect, this application further provides a communications system. The communications system includes system software, a master chip, and a slave chip. The master chip and the slave chip are connected by using a bus or a CCIX bus.

The system software is configured to: obtain a training rate of each of a master chip and a slave chip in a target phase of equalization training, where the target phase is a third phase or a fourth phase; and determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

The apparatus provided in this embodiment can be used to implement the equalization training method according to any one of the first aspect or the possible embodiments of the first aspect. It can be learned that when the apparatus provided in this embodiment is used, the master chip has plenty of equalization timeout periods in the third phase of the equalization, and correspondingly, the master chip does not exit an equalization operation in the third phase due to insufficient time; and the slave chip also has plenty of equalization timeout periods in the fourth phase of the equalization, and correspondingly, the slave chip does not exit an equalization operation in the fourth phase due to insufficient time. Therefore, according to the apparatus provided in this embodiment, a probability that the chips exit an equalization operation due to insufficient equalization timeout periods can be reduced to some extent, to effectively improve the link negotiation success rate.

With reference to the eleventh aspect, in a possible embodiment, when the target rate threshold interval is a threshold interval including a minimum rate in the N+1 rate threshold intervals, the target equalization timeout period is a forward compatible equalization timeout period.

With reference to the eleventh aspect, in a possible embodiment, the correspondence between the N+1 rate threshold intervals and the N+1 equalization timeout periods is prestored in a register of the master chip or in a register of the slave chip.

With reference to the eleventh aspect, in a possible embodiment, before the training rate of each of the master chip and the slave chip in the target phase of equalization training is obtained, the system software is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

With reference to the eleventh aspect, in a possible embodiment, after equalization training in the target phase of the current round of equalization training is completed, the system software is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

With reference to the eleventh aspect, in a possible embodiment, the system software is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

It should be noted that for beneficial effects of the eleventh aspect or the possible embodiments of the eleventh aspect, refer to beneficial effects of the foregoing associated embodiments. Because of high similarity, details are not described herein again.

According to a twelfth aspect, this application further provides a communications system. The communications system includes system software, a master chip, and a slave chip. The master chip and the slave chip are connected by using a bus or a CCIX bus.

The system software is configured to: determine whether to use a fast equalization training mode; when it is determined to use the fast equalization training mode, obtain a sending parameter and a receiving parameter of each of a master chip and a slave chip in a target phase of a previous round of equalization training, and respectively configure the sending parameter and the receiving parameter as initial parameters of the master chip and the slave chip in a target phase of a current round of equalization training, where a target phase of equalization training is a third phase or a fourth phase of the equalization training; obtain a forward compatible equalization timeout period in the target phase of equalization training, and configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

The apparatus provided in this embodiment can be used to implement the equalization training method according to any one of the second aspect or the possible embodiments of the second aspect. It can be learned that, according to the apparatus provided in this embodiment, the initial parameters of the master chip and the slave chip in the target phase of the current round of equalization training can be configured more quickly. The equalization training method is optimized, to help obtain an equalization parameter in a phase of the current round of equalization training more quickly. There is greater applicability and higher efficiency. In addition, a probability of exiting due to insufficient time in the target phase of equalization training is effectively reduced, and a link negotiation success rate is improved.

With reference to the twelfth aspect, in a possible embodiment, after equalization training in the target phase of the current round of equalization training is completed, the system software is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

With reference to the twelfth aspect, in a possible embodiment, before it is determined to use the fast equalization training mode, the system software is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

It should be noted that for beneficial effects of the twelfth aspect or the possible embodiments of the twelfth aspect, refer to beneficial effects of the foregoing associated embodiments. Because of high similarity, details are not described herein again.

According to a thirteenth aspect, an embodiment of this application provides a computer program product. The computer program product includes computer program code. When the computer program code is run by a unit module, a transceiver, or a manager of an equalization training apparatus, the apparatus is enabled to perform any method according to any one of the first aspect, the second aspect, and the embodiments of the first aspect and the second aspect.

According to a fourteenth aspect, an embodiment of this application provides a computer-readable storage medium. The computer-readable storage medium stores a program, and the program enables an equalization timeout period training apparatus (for example, a master chip; for another example, a slave chip) to perform any method according to any one of the first aspect, the second aspect, and the embodiments of the first aspect and the second aspect.

DESCRIPTION OF EMBODIMENTS

The following describes this application in detail with reference to the accompanying drawings in the specification.

Figure 1:
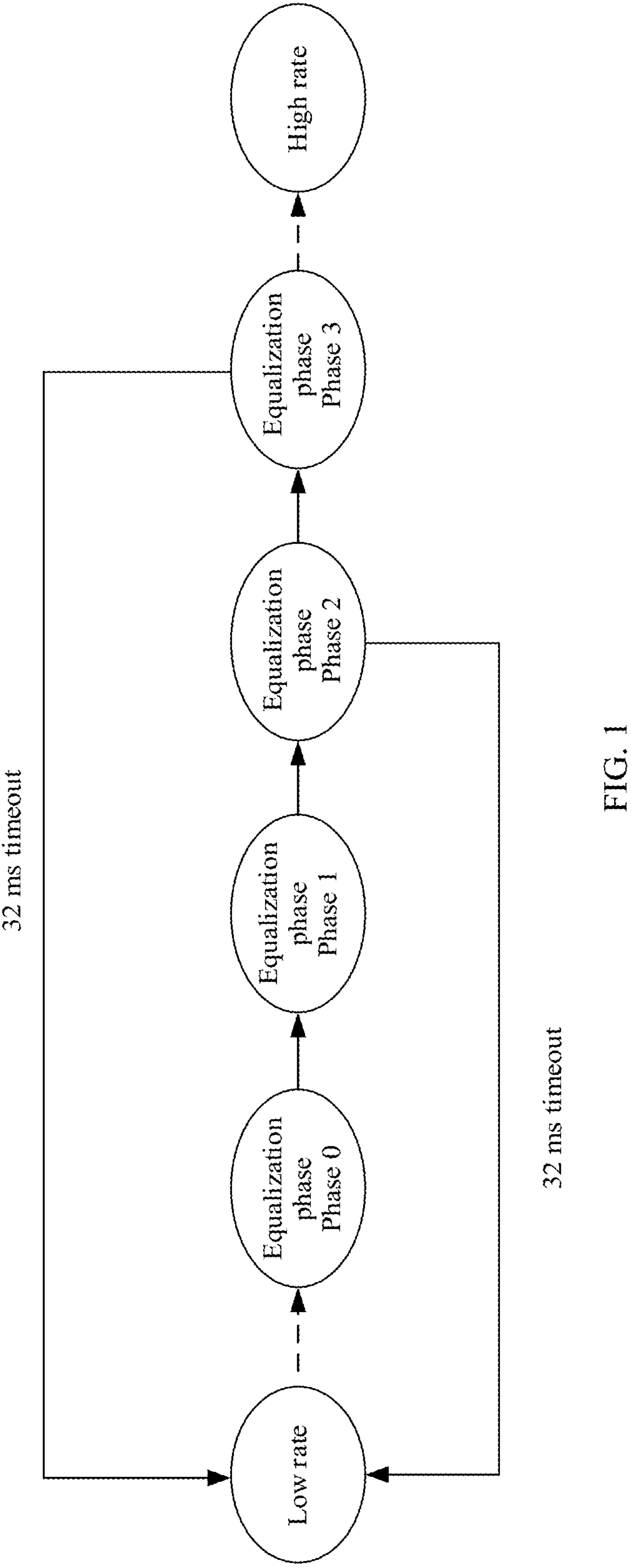
FIG. 1 is a schematic diagram of variable-speed equalization training according to this application.
Figure 2:
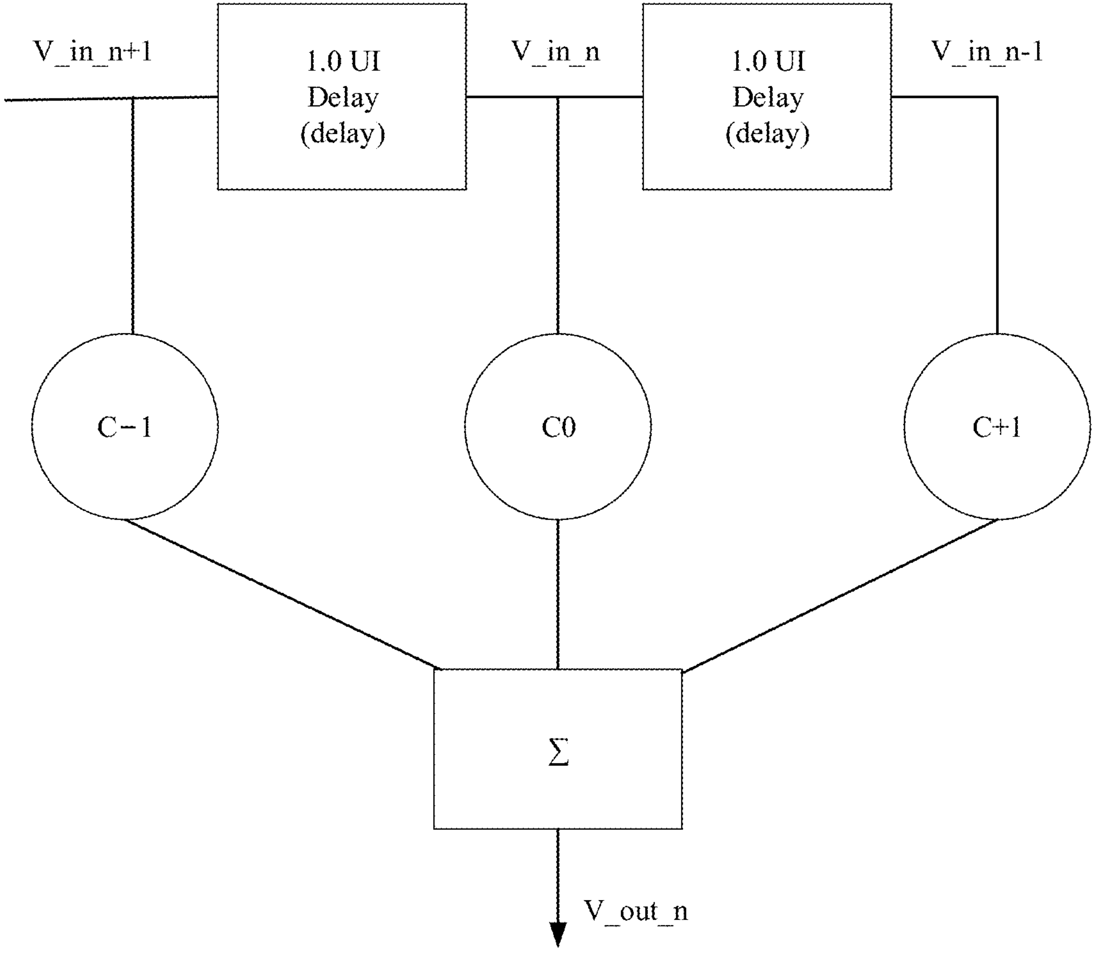
FIG. 2 is a schematic diagram of an equalization circuit according to this application.

PCIe is a computer expansion bus standard. A PCIe bus is usually used in a processor that needs to perform high-speed data transmission, for example, a computer system, a server, a memory, or a mobile phone, to connect to a peripheral device. From PCIe 3.0, in PCIe, a sending and receiving equalization circuit is used to resolve a signal quality problem. In addition, an equalization training mechanism is defined. As shown in FIG. 1, the equalization training mechanism includes a total of four phases: Phase 0 to Phase 3. Phase 2 is mainly a process in which a master chip adjusts a sending parameter of a slave chip, and the master chip adjusts a receiving parameter of the master chip correspondingly, expecting that a link reaches a stable state in which a bit error rate is less than 10E-12 required in a protocol. Phase 3 is mainly a process in which the slave chip adjusts a sending parameter of the master chip and a receiving parameter of the slave chip. In other words, Phase 2 and Phase 3 are mainly respectively used for parameter training of an equalization circuit of a transmit end and a receive end, to ensure that a proper equalization circuit parameter is found. For example, in a block diagram of an equalization circuit shown in FIG. 2, a value of an equalization parameter may be represented as a value C−1/C0/C+1.

In addition, during PCIe equalization training, a fixed equalization timeout period is specified in each phase of a current round of equalization training. For example, as shown in FIG. 1, a maximum time limit of an equalization timeout period specified in Phase 2 and Phase 3 is usually 32 ms. If the equalization training is not completed within the specified equalization timeout period, timeout is triggered, and a link equalization failure is announced.

As a PCIe rate is continuously increased, a PCIe transmission rate is increased from 2.5 Gigabits (Gbps) in PCIe 1.0 to 64 Gbps in PCIe 6.0. With advancement of science and technology, a higher rate is to be used subsequently. During higher-speed transmission, a transmit end and a receive end of a chip require a more complex equalization circuit structure and a large quantity of equalization parameters.

Therefore, in a phase of equalization training, it needs to take more time to determine an equalization parameter, even from a millisecond (ms) level to a second(s) level, far more than a maximum time requirement of 32 ms currently required in a PCIe protocol. However, in this case, when communication transmission is performed on a higher-speed link, a link negotiation success rate is low.

The following solutions are currently provided to resolve the foregoing problem:

An equalization timeout period is configured based on a link loss. To be specific, the link loss is divided into different loss types such as long reach (LR) and short reach (SR). During equalization training, the link loss types are determined, and based on a requirement of different link loss types for an equalization timeout period, equalization timeout periods in Phase 2 and Phase 3 of equalization training are configured to have different values.

However, determining a link loss type is a complex problem. In addition, when the equalization timeout period is configured based on the link loss type, a constraint range is broad, and adjustment cannot be performed more flexibly for equalization training for a same loss type and different rates.

To resolve the foregoing problem, an embodiment of this application provides an equalization training method. A technical solution in this embodiment of this application may be applied to various bus processing systems, for example, a processor system to which a PCIe bus is applied (which may also be briefly referred to as a "PCIe system"), and a processor system to which a CCIX bus is applied (which may also be briefly referred to as a "CCIX system").

For ease of understanding the embodiments of this application, a PCIe system is only used as an example to describe the solutions used in this application in detail below. It should be learned that the CCIX system also has a same or similar feature. For details, refer to the following description about the PCIe system below to understand the CCIX system applied. Therefore, details are not described again.

Figure 3:
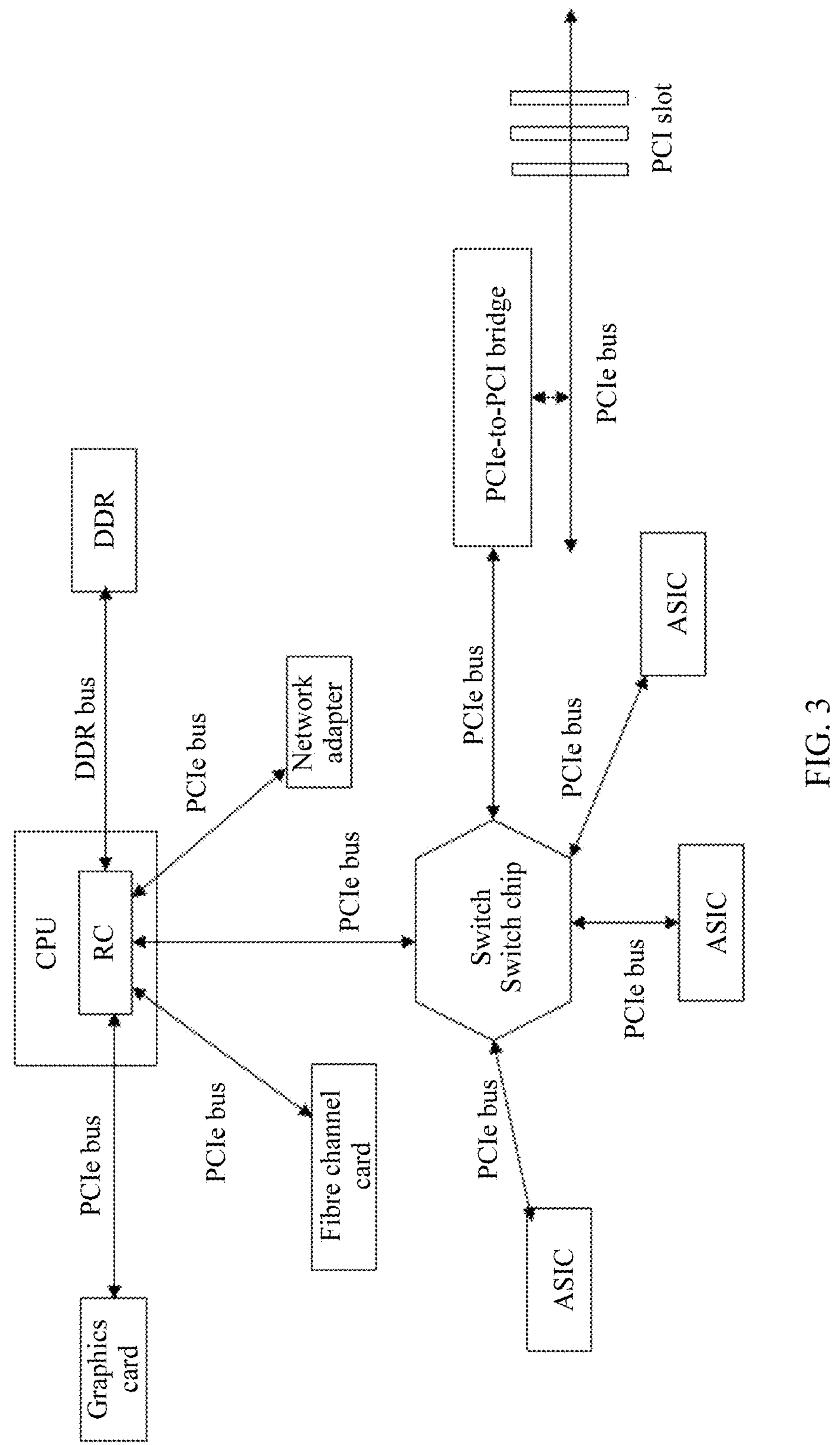
FIG. 3 is a schematic diagram of a system architecture according to an embodiment of this application.

FIG. 3 shows a processor system to which a PCIe bus is applied. The system includes a root complex (RC), a switch chip (switch), a PCIe-to-PCI bridge, and the like.

Specifically, the RC is also referred to as a root controller of the system, and is usually integrated into a central processing unit (CPU). The RC usually has a plurality of ports. The RC may be connected to one component through each of the plurality of ports. The plurality of ports may include a plurality of ports (briefly referred to as PCIe ports) that are configured to be connected to a PCIe bus. The RC may be connected to one endpoint through one PCIe port. Naturally, the RC and the endpoint are connected to each other by using the PCIe bus. It should be noted that, as shown in FIG. 3, the endpoint may be a graphics card, a network adapter, a fibre channel card, a switch, an application-specific integrated circuit (ASIC), or the like. In the processor system shown in FIG. 1, the RC and a double date rate (DDR) are connected to each other by using a DDR bus. Therefore, a port on the RC connected to the DDR is not a PCIe port. Therefore, all or some of the plurality of ports of the RC are PCIe ports.

The switch is configured to perform link expansion on the RC. Specifically, the switch and the RC are connected to each other by using the PCIe bus. In addition, the switch has a plurality of ports, and the switch may be connected to an EP through one port by using the PCIe bus. Therefore, the RC may be connected to a plurality of endpoints through one port based on the switch. As shown in FIG. 3, the switch has three ports, and through any one of the three ports, the switch may be connected to one ASIC through the PCIe bus.

The PCIe-to-PCI bridge is used for bridging, and is used to implement conversion between a PCIe bus and a PCI bus, to be compatible with an original endpoint that supports the PCI bus. As shown in FIG. 3, one end of a PCIe-to-PCI bridge is connected to the switch by using the PCIe bus, and the other end is connected to the PCI bus. Further, FIG. 3 further shows a plurality of PCI slots that support a PCI bus standard. A chip or a card inserted into the PCI slot can be connected to the PCIe-to-PCI bridge by using the PCI bus, and is further connected to the CPU by using the switch.

Figure 4:
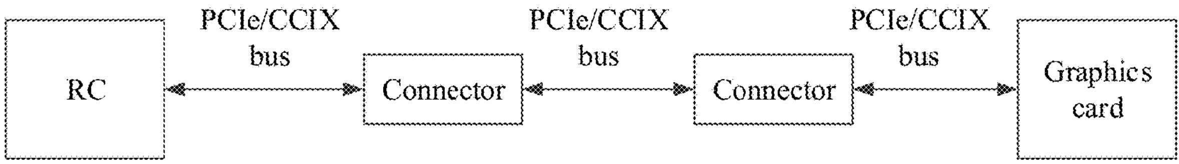
FIG. 4 is a schematic diagram of a signal channel between an RC and a graphics card according to this application.

It should be noted that the RC and the endpoint may be directly connected through the PCIe bus, or may be connected through the PCIe bus and a connector. As shown in FIG. 4, the RC and the graphics card are connected to each other successively by using a PCIe bus, a connector, a PCIe bus, a connector, and a PCIe bus. It should be learned that lengths of the plurality of PCIe buses located between the RC and the endpoint may be the same, or may be different.

For ease of understanding, the "system" mentioned a plurality of times in this application is described herein. The system described in this application is a system to which a PCIe/CCIX bus is applied (referred to as a "PCIe/CCIX" system for short). The PCIe/CCIX system may include one central processing unit CPU and a peripheral device of the CPU. At least one of channels between the CPU and the peripheral device of the CPU uses the PCIe/CCIX bus. The PCIe/CCIX system may alternatively include a plurality of CPUs and peripheral devices of the CPUs. At least one of channels between the plurality of CPUs uses the PCIe/CCIX bus, or at least one of channels between one of the plurality of CPUs and a peripheral device uses the PCIe/CCIX bus.

Figure 5:
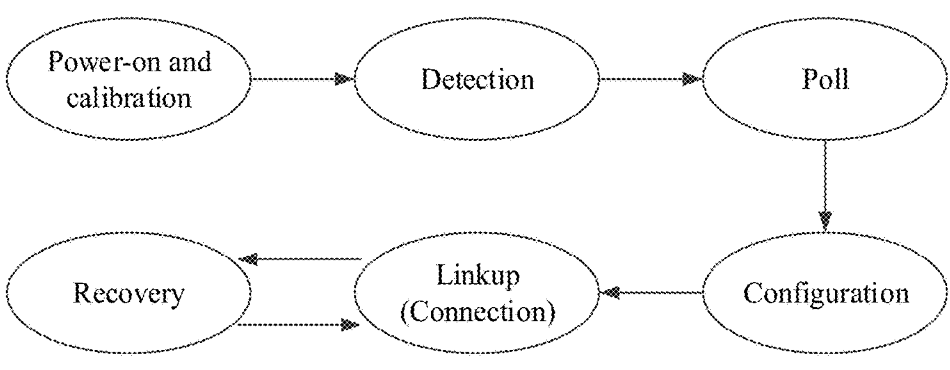
FIG. 5 is a flowchart of link establishment specified in a PCIe standard.

FIG. 5 is a flowchart of a PCIe system from power-on to communication connection establishment. It is specified in a PCIe standard that after being powered on or reset, a link state machine in a master chip controls a link to sequentially enter the following phases: detection→polling→configuration→linkup→recovery. Specifically, in the detection phase, the master chip detects whether a slave chip is in position. After it is detected that a slave chip is present, the master chip enters the polling phase, to perform bit locking and determine a training rate, or perform bit locking and determine a training mode (in other words, whether to use a fast equalization training mode). Then, the configuration phase is entered, to determine a link bandwidth and a link number, and perform channel-to-channel phase compensation and the like. After configuration is completed, the system enters the linkup phase; in this phase, the link runs to linkup at a low speed, that is, the master chip and the slave chip establish a connection. Then, a system enters the recovery phase, to configure an equalization timeout period and change a rate. After the rate is changed and increased to a high rate, the system returns to a connected state, to implement service data transmission.

It should be noted that the master chip in this application is a chip that includes a downstream port (DSP). Sometimes, the master chip is also briefly referred to as a downstream port. The slave chip in this application is a chip that includes an upstream port (USP). Sometimes, the slave chip is also briefly referred to as an upstream port.

Further, it may be learned with reference to FIG. 3 that in this application, the master chip may be an RC, or may be a switch chip (switch). When the master chip is an RC, the slave chip may be an endpoint device (endpoint), or may be a switch chip (switch). When the master chip is a switch chip, the slave chip may be an endpoint device. The endpoint device may be a graphics card, a network adapter, an optical channel card, a storage card, a switch chip, or the like.

Figure 6:
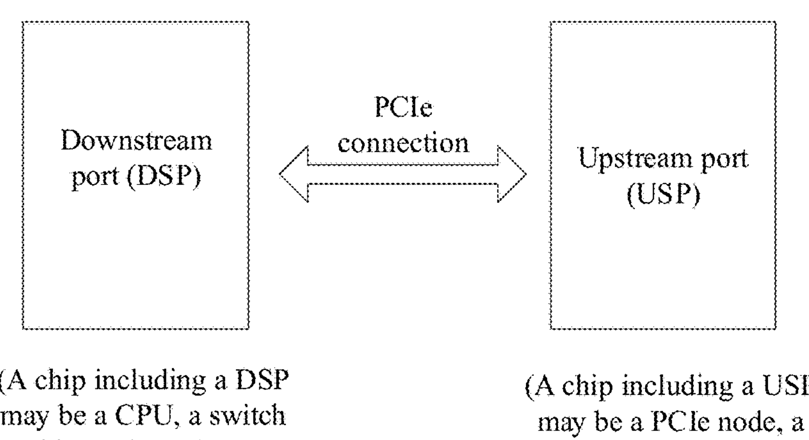
FIG. 6 is a schematic diagram of a scenario according to an embodiment of this application.

For example, in this embodiment of this application, that chips having a processing function are selected as a sending terminal device and a receiving terminal device is used as an example, and a specific scenario of this embodiment of this application is described in detail. The scenario includes a PCIe link and chips at both ends of the link. A chip at one end includes a downstream port (DSP), and a chip at the other end includes an upstream port (USP). As shown in FIG. 6, the chip including the DSP may be a CPU (including a root complex part), a switch chip (switch), and a retimer, and the chip including the USP may be a PCIe node (an FC card, IB, or the like), a switch chip (switch), a retimer, and the like.

It should be noted that an operation regarding the equalization time is performed between the master chip and the slave chip. In this application, the master chip and the slave chip may be located in a same processor system, or may be located in different processor systems. The master chip and the slave chip are connected to each other through a PCIe/CCIX bus. The RC in FIG. 3 is corresponding to the master chip, and the endpoint in FIG. 1 is corresponding to the slave chip.

It should be noted that, in this embodiment of this application, an operation of configuring an equalization timeout period may be implemented in different phases, may be implemented in a recovery phase, or may be implemented after a chip is powered on and before a PCIe/CCIX state machine is started.

For example, in a calibration phase of a power-on chip, system software configures registers of chip function modules at both ends of the link, for example, through interfaces such as an I2C interface and a JTAG interface, to complete the operation. Alternatively, in a link negotiation phase, the chips at both ends complete the operation through negotiation by using a TS sequence. Alternatively, the link is initialized at a low rate (for example, 2.5G), completes configuration via an in-band channel, and is changed to a high rate through negotiation.

A system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that: With evolution of the system architecture and emergence of new service scenarios, the technical solutions provided in the embodiments of this application are also applicable to similar technical problems. It should be understood that FIG. 3 to FIG. 6 are merely example simplified schematic diagrams for ease of understanding. The system may further include another apparatus, another structure, or the like, which is not shown in FIG. 3 to FIG. 6.

First, some terms in the embodiments of this application are for ease of understanding.

(1) A "PCIe bus" in the embodiments of this application is a high-speed serial computer expansion bus standard.

PCIe is high-speed serial point-to-point dual-channel high-bandwidth transmission. A connected device is allocated with exclusive channel bandwidth but does not share bus bandwidth. The connected device mainly supports functions such as active power management, error reporting, end-to-end reliability transmission, hot plugging, and quality of service (QoS). The PCIe bus has a higher transmission rate than a PCI bus.

It should be noted that the PCIe bus in the embodiments of this application may be applied to both an internal interconnection and an external interconnection.

(2) A "CCIX bus" in the embodiments of this application has a same physical architecture as the PCIe bus, and the physical architecture includes an electrical sub-block and a logical sub-block. The CCIX bus supports a transmission rate of PCIe 1.0, PCIe 2.0, PCIe 3.0, and PCIe 4.0.

It should be noted that the CCIX bus in the embodiments of this application may be applied to both an internal interconnection and an external interconnection.

(3) In the embodiments of this application, a "state machine" includes a state register and a combinational logic circuit, can perform state transition based on a preset state and a control signal, and is a control center that coordinates a related signal action and completes a specific operation.

(4) In the embodiments of this application, "equalization training" is a technology in which in a communications system, a transmission signal in the communications system is distorted due to existence of various noise and interference; in other words, a channel is a non-ideal channel, and these characteristics of the channel are compensated for and corrected.

(5) In the embodiments of this application, an "equalization timeout period" is a maximum time limit in a phase of equalization training. To be specific, if equalization training is not completed within a specified equalization timeout period, timeout is triggered, and a link equalization failure is announced.

In the embodiments of this application, a term "at least one" means one or more, and "a plurality of" means two or more. And/or describes an association relationship between associated objects, and indicates that three relationships may exist. For example, A and/or B may indicate the following cases: A exists alone, both A and B exist, and B exists alone, where A and B may be singular or plural. The character "/" generally indicates an "or" relationship between the associated objects. The term "at least one (one piece) of the following" or a similar expression thereof means any combination of these items, including any combination of a singular item (piece) or plural items (pieces). For example, at least one item (piece) of a, b, or c may indicate: a, b, c, a and b, a and c, b and c, or a, b, and c, where a, b, and c may be singular or plural.

Unless otherwise stated, ordinal numbers such as "first" and "second" mentioned in the embodiments of this application are intended to distinguish a plurality of objects, rather than limit an order, a time sequence, priorities, or importance degrees of the plurality of objects.

In addition, the terms "include/comprise" and "have" in the embodiments of this application, the claims, and the accompanying drawings are not exclusive. For example, a process, method, system, product, or device including a series of operations or modules is not limited to the listed operations or modules, and may further include an operation or module that is not listed.

1. According to description of content such as the foregoing application scenario, an embodiment of this application provides a first equalization training method.

In the equalization training method provided in this embodiment of this application, a target phase of equalization training is a third phase or a fourth phase. In other words, a target equalization timeout period required in two Phase 2 and/or Phase 3 is configured in the equalization training method provided in this embodiment of this application.

In addition, before the first equalization training method in this application is performed, the following configuration further needs to be performed on a PCIe system.

Figure 7:
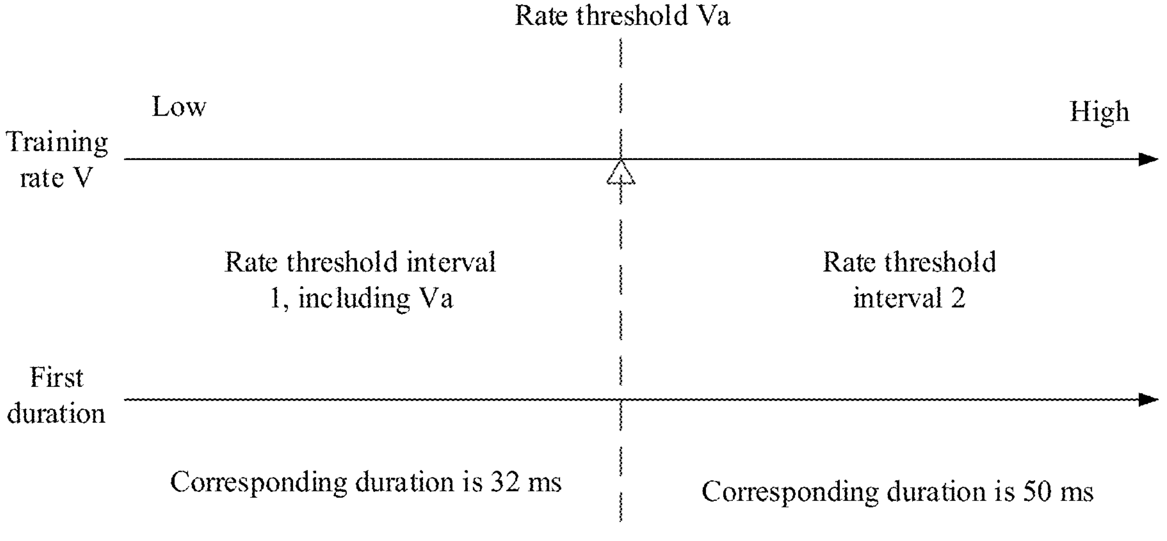
FIG. 7 is a schematic diagram of a first scenario in which a first equalization timeout period is determined according to an embodiment of this application.
Figure 8:
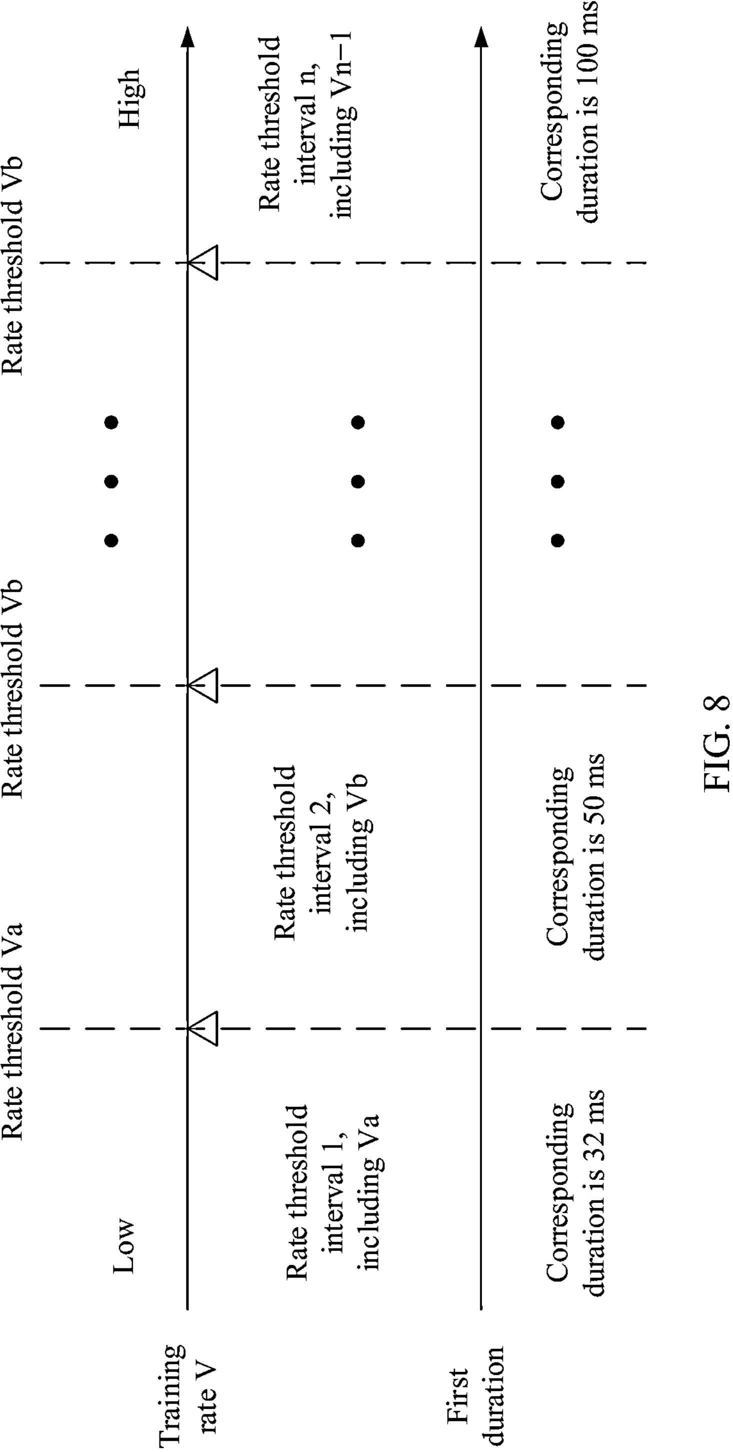
FIG. 8 is a schematic diagram of a second scenario in which a first equalization timeout period is determined according to an embodiment of this application.

First, a correspondence between N+1 rate threshold intervals and N+1 equalization timeout periods needs to be established and stored in the PCIe system, as shown in FIG. 7 or FIG. 8.

In some embodiments, when a phase of equalization training is an equalization training phase 3, the correspondence between the N+1 rate threshold intervals and the N+1 equalization timeout periods is prestored in a register of a master chip. When the phase of equalization training is an equalization training phase 4, the correspondence between the N+1 rate threshold intervals and the N+1 equalization timeout periods is prestored in a register of a slave chip.

It should be noted that after the correspondence between the N+1 rate threshold intervals and the N+1 equalization timeout periods is stored in the PCIe system, none of power-on, power-off, and reset of the system causes loss of the correspondence between the N+1 rate threshold intervals and the N+1 equalization timeout periods. In some embodiments, the correspondence between the N+1 rate threshold intervals and the N+1 equalization timeout periods is stored in a memory in the PCIe system.

Figure 9:
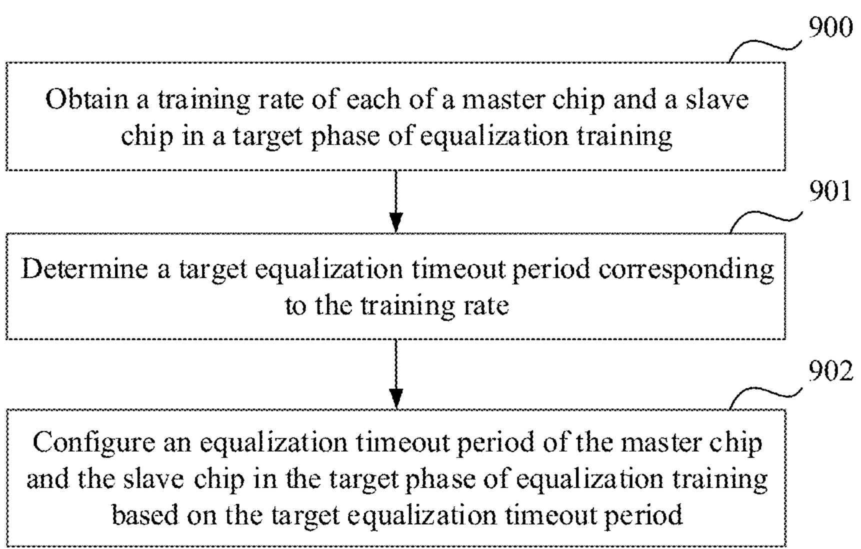
FIG. 9 is a schematic flowchart of a first equalization training method according to an embodiment of this application.

Further, for specific operations of the first equalization training method, refer to operations in FIG. 9.

S900: Obtain a training rate of each of a master chip and a slave chip in a target phase of equalization training.

In an optional manner in this embodiment of this application, the training rate in the target phase of equalization training is obtained in the following manner:

In this embodiment of this application, a negotiation sequence that is of the master chip and the slave chip and that is used for the target phase of equalization training is obtained, and the training rate in the target phase of equalization training is determined based on a first specific bit value in the negotiation sequence. The first specific bit value indicates rate information of training that needs to be performed.

Specifically, after the first specific bit value is obtained, the training rate in a target phase of to-be-performed equalization training is determined based on a correspondence between the first specific bit value and a training rate, for example, the training rate is V.

For example, PCIe 5.0 is used as an example. It is assumed that the first specific bit value used to indicate the training rate is last two bits in the negotiation sequence. The correspondence between a bit value and a training rate is shown in Table 1.

For example, if the first specific bit value is 01, it is determined that the training rate at which equalization training is to be performed is 16 gigatransfers per second (GT/s).

TABLE 1

Correspondence between a bit value and a training rate

| Bit value | Training rate |
|---|---|
| 00b | 8.0 GT/s |
| 10b | 16.0 GT/s |
| 01b | 32.0 GT/s |
| 11b | Reserved |

The correspondence between a bit value and a training rate shown in Table 1 is prestored in a memory of a PCIe/CCIX system. Specifically, the memory may be a flash memory, an electrically erasable programmable read-only memory (EEPROM), or the like.

S901: Determine a target equalization timeout period corresponding to the training rate.

The target equalization timeout period represents a maximum time limit for obtaining an equalization parameter in the target phase of equalization training.

In an optional manner in this embodiment of this application, a target rate threshold interval within which the training rate in the target phase falls is determined, and a target equalization timeout period corresponding to the target rate threshold interval is determined based on a correspondence between N+1 rate threshold intervals and N+1 equalization timeout periods. N rate thresholds are predetermined, N is an integer greater than or equal to 0, and a longer rate threshold interval corresponds to a longer equalization timeout period.

Further, in this embodiment of this application, a search for the target equalization timeout period is separately described in detail based on a value of N.

Value case 1: N=2. To be specific, there is currently one rate threshold, and there are two rate threshold intervals.

Specifically, the rate threshold interval within which the training rate falls is determined based on the obtained training rate. For example, the training rate is V. When there is one rate threshold, for example, the rate threshold Va, the corresponding target equalization timeout period is determined based on a rate threshold interval within which the obtained training rate V falls.

For example, as shown in FIG. 7, there is currently one rate threshold, namely, Va. Therefore, there are currently two rate threshold intervals, to be specific, a rate threshold interval 1 used to indicate that the training rate is less than the rate threshold Va, and a rate threshold interval 2 used to indicate that the training rate is greater than or equal to the rate threshold Va.

It is assumed that a target equalization timeout period corresponding to the rate threshold interval 1 is 32 ms, and a target equalization timeout period corresponding to the rate threshold interval 2 is 50 ms.

Further, the obtained training rate V is compared with the rate threshold Va, to determine a rate threshold interval within which the training rate falls.

It is assumed that if V≥Va, the training rate falls within the rate threshold interval 2. In this case, the target equalization timeout period corresponding to the training rate is 50 ms. Similarly, if V<Va, the training rate falls within the rate threshold interval 1. In this case, the target equalization timeout period corresponding to the training rate is 32 ms.

In addition, in an optional manner in this embodiment of this application, to reduce system overheads caused by searching for the target equalization timeout period in an unnecessary case, before S901 is performed, the obtained training rate is further compared with a specified minimum rate threshold. The minimum rate threshold is used to determine whether to continue to use a forward compatible equalization timeout period as a configured equalization timeout period.

Specifically, if it is determined that the training rate is greater than or equal to the minimum rate threshold, or if it is determined that the training rate is greater than the minimum rate threshold, S901 is performed. On the contrary, if it is determined that the training rate is less than or equal to the minimum rate threshold, or if it is determined that the training rate is less than the minimum rate threshold, it is determined that the target equalization timeout period is the forward compatible equalization timeout period. For example, equalization training is directly performed based on the forward compatible equalization timeout period of 32 ms.

Further, in this embodiment of this application, before S901 is performed, it is determined that the forward compatible equalization timeout period does not continue to be used as the target equalization timeout period. When the equalization timeout period, namely, the target equalization timeout period, needs to be reselected, there is a scenario of the value case 1. The rate threshold Va is the minimum rate threshold. In this case, it may be directly determined that the training rate V falls within the rate threshold interval 2, and corresponding first duration is 50 ms.

Value case 2: N>2. To be specific, there are currently at least two rate thresholds, and there are at least three rate threshold intervals.

Specifically, the rate threshold interval within which the training rate falls is determined based on the obtained training rate. For example, the training rate is V. When there are at least two rate thresholds, a corresponding target equalization timeout period is determined based on a rate threshold interval within which the obtained training rate value V falls.

For example, as shown in FIG. 8, there are currently at least two rate thresholds, for example, a first rate threshold Va, a second rate threshold Vb, . . . , and an $(N-1)^{th}$ rate threshold Vn−1. Therefore, there are currently at least three rate threshold intervals, to be specific, a rate threshold interval 1 used to indicate that the training rate is less than the rate threshold Va, a rate threshold interval 2 used to indicate that the training rate is greater than or equal to the rate threshold Va and less than the rate threshold Vb, . . . , and a rate threshold interval Vn used to indicate that the training rate is greater than or equal to a rate threshold Vn−2 and less than the rate threshold Vn−1.

It is assumed that a target equalization timeout period corresponding to the rate threshold interval 1 is 32 ms, a target equalization timeout period corresponding to the rate threshold interval 2 is 50 ms, . . . , and a target equalization timeout period corresponding to the rate threshold interval Vn is 100 ms.

Further, a specific rate threshold interval within which the training rate falls is determined based on the obtained training rate V.

It is assumed that if Va≤V<Vb, the training rate falls within the rate threshold interval 2. In this case, the target equalization timeout period corresponding to the training rate is 50 ms. Similarly, if V<Va, the training rate falls within the rate threshold interval 1. In this case, the target equalization timeout period corresponding to the training rate is 32 ms. Similarly, if Vn−1< V, the training rate falls within the rate threshold interval Vn. In this case, the target equalization timeout period corresponding to the training rate is 100 ms.

In addition, in an optional manner in this embodiment of this application, to reduce system overheads caused by searching for the target equalization timeout period in an unnecessary case, before S901 is performed, the obtained training rate is further compared with a specified minimum rate threshold. The minimum rate threshold is used to determine whether to continue to use a forward compatible equalization timeout period as a configured equalization timeout period.

Further, in this embodiment of this application, before S901 is performed, it is determined that the forward compatible equalization timeout period does not continue to be used as a configured equalization timeout period. When the equalization timeout period, namely, the target equalization timeout period, needs to be reselected, there is a scenario of the value case 2. The rate threshold Va is the minimum rate threshold. In this case, when the target equalization timeout period is determined, there is no need to compare the training rate V with the rate threshold Va.

S902: Configure an equalization timeout period of the master chip and the slave chip in a phase of equalization training based on the target equalization timeout period.

Further, if an equalization parameter that satisfies link stability requirements is found within the target equalization timeout period, it is determined that a current round of equalization training succeeds, and communication is performed based on the training rate; or if an equalization parameter that satisfies link stability requirements is not found within the target equalization timeout period, it is determined that a current round of equalization training fails.

It should be learned that after the foregoing equalization timeout period configuration is completed, a link state machine completes link establishment according to a process shown in FIG. 5, in accordance with a negotiation procedure stipulated in a PCIe bus standard.

2. According to description of content such as the foregoing application scenario, an embodiment of this application provides a second equalization training method.

Before the second equalization training method in this application is performed, the following configuration further needs to be performed on a PCIe system.

First, a sending parameter and a receiving parameter in a target phase of a previous round of equalization training need to be created and stored in the PCIe system.

In some embodiments, after equalization training in the target phase of the previous round of equalization training is completed, an equalization parameter of a master chip in a target phase of a current round of equalization training is stored in a register of the master chip, and an equalization parameter of a slave chip in a target phase of a current round of equalization training is stored in a register of the slave chip; or equalization parameters of the master chip and the slave chip in a target phase of a current round of equalization training are stored in a register of the master chip; or equalization parameters of the master chip and the slave chip in a target phase of a current round of equalization training are stored in a register of the slave chip.

It should be noted that, after the sending parameter and the receiving parameter in the target phase of the previous round of equalization training are stored in the PCIe system, none of power-on, power-off, and reset of the system causes loss of the sending parameter and the receiving parameter in the target phase of the previous round of equalization training. Specifically, the sending parameter and the receiving parameter in the target phase of the previous round of equalization training are stored in a memory in the PCIe system.

Figure 10:
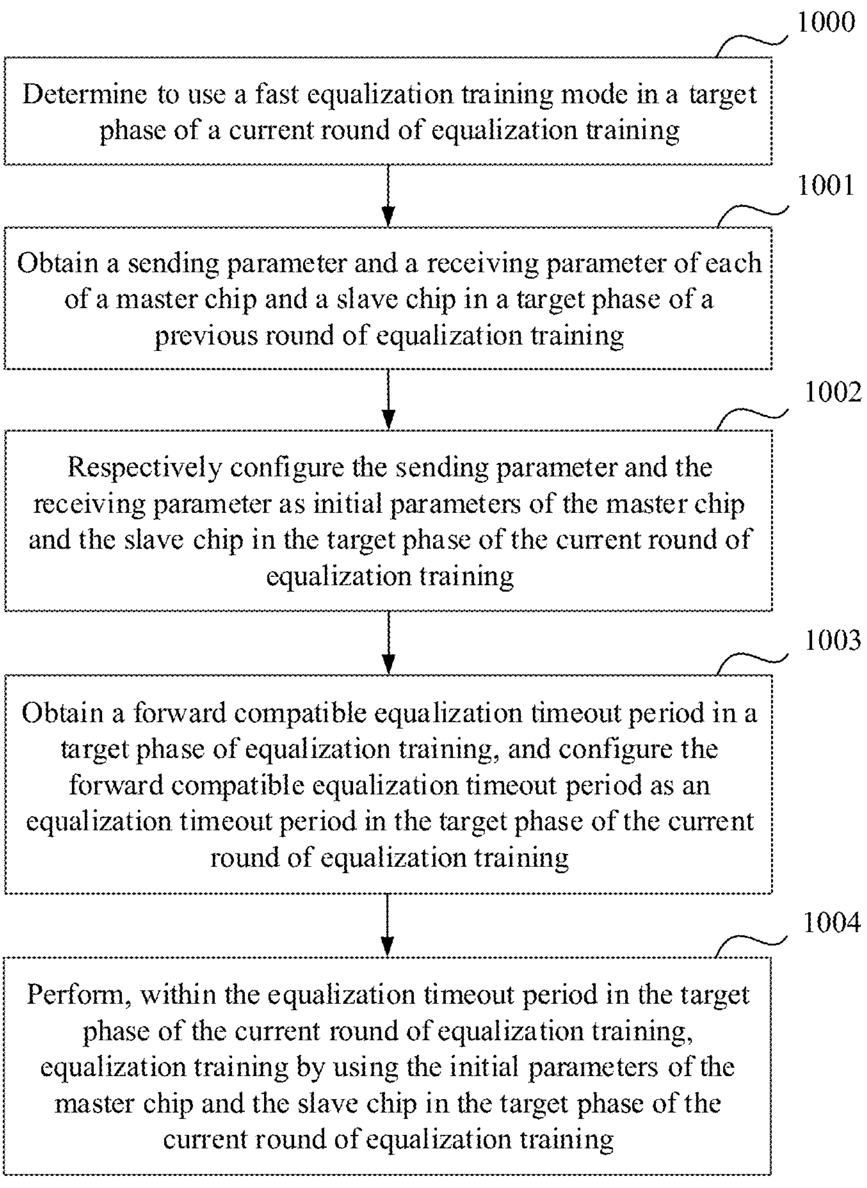
FIG. 10 is a schematic diagram of a second equalization training method according to an embodiment of this application.

Further, for specific operations of the second equalization training method, refer to operations in FIG. 10.

S1000: Determine to use a fast equalization training mode in a target phase of a current round of equalization training.

The fast equalization training mode is a mode in which the initial parameters of a master chip and a slave chip in the target phase of the current round of equalization training are separately configured based on a sending parameter and a receiving parameter in a target phase of a previous round of equalization training.

S1001: Obtain the sending parameter and the receiving parameter of each of the master chip and the slave chip in the target phase of the previous round of equalization training.

In this embodiment of this application, after the target phase of the previous round of equalization training is successfully performed, an equalization parameter (to be specific, the sending parameter and the receiving parameter) obtained in the target phase of the previous round of equalization training is recorded. For example, the equalization parameter obtained in the previous round is a second equalization parameter, to directly invoke the second equalization parameter in the target phase of the current round of equalization training to determine a target equalization parameter of the current round.

S1002: Respectively configure the sending parameter and the receiving parameter as initial parameters of the master chip and the slave chip in the target phase of the current round of equalization training.

In this embodiment of this application, a target equalization parameter in the target phase of the current round of equalization training is the initial parameter or is further determined based on the initial parameter.

In a same running environment, there is a slight difference between a target equalization parameter in the target phase of the previous round of equalization training and the target equalization parameter in the target phase of the current round of equalization training. Therefore, when the target phase of the current round of equalization training is performed, the target equalization parameter of the previous round is directly used as the target equalization parameter of the current round, to effectively reduce time for determining the target equalization parameter. Alternatively, the target equalization parameter of the current round is determined based on the target equalization parameter of the previous round, so that a rough range of the target equalization parameter of the current round can be better learned, to help quickly determine the target equalization parameter of the current round, and reduce the time for determining the target equalization parameter.

S1003: Obtain a forward compatible equalization timeout period in a target phase of equalization training, and configure the forward compatible equalization timeout period as an equalization timeout period in the target phase of the current round of equalization training.

S1004: Perform, within the equalization timeout period in the target phase of the current round of equalization training, equalization training by using the initial parameters of the master chip and the slave chip in the target phase of the current round of equalization training.

Further, if a first equalization parameter is found within the equalization timeout period configured in a phase of the current round of equalization training, it is determined that the current equalization training succeeds; or if a first equalization parameter is not found within the equalization timeout period configured in a phase of the current round of equalization training, it is determined that the current round of equalization training fails.

3. Further, in this embodiment of this application, the solution in FIG. 9 and the solution in FIG. 10 may be used in combination with each other in an actual equalization training process. To be specific, before S900 in FIG. 9 is performed, it is determined whether to enable a fast training mode. For details, refer to operations in FIG. 11. For brief description, for configuration content of this part and details of an execution process, refer to description of the foregoing content. Details are not described herein again.

S1100: In a process of current equalization training, determine whether to use a fast equalization training mode, and if it is determined to use the fast equalization training mode, perform S1101, or if it is determined not to use the fast equalization training mode, perform S1102.

In an optional manner in this embodiment of this application, whether to use the fast equalization training mode is determined in the following manner:

In this embodiment of this application, a negotiation sequence that is of a master chip and a slave chip and that is used for a target phase of equalization training is obtained, and whether to use the fast equalization training mode is determined based on a second specific bit value in the negotiation sequence. The second specific bit value indicates whether to use the fast equalization training mode.

For example, it is assumed that the second specific bit value used to indicate whether to use the fast equalization training mode as the first bit in the negotiation sequence. A correspondence between a bit value and an equalization training mode is shown in Table 2.

For example, when the first specific bit value is 0, it indicates not to use (disable) the fast equalization training mode, and when the first specific bit value is 1, it indicates to use (enable) the fast equalization training mode.

TABLE 2

| Correspondence between a bit value and an equalization training mode | |
|---|---|
| Bit value | Equalization training mode |
| 0b | Not to use a fast equalization training mode |
| 1b | Use a fast equalization training mode |

It should be noted that, a plurality of bits may also be used for representation in this embodiment of this application. For example, two bits are used to indicate whether to use the fast equalization training mode, and a bit used to indicate whether to use the fast equalization training mode is the first two bits in the negotiation sequence. In some embodiments, 00 indicates "disable", and 01 indicates "enable".

S1101: Obtain a sending parameter and a receiving parameter of each of the master chip and the slave chip in a target phase of a previous round of equalization training, and continue to perform S1103.

S1102: Obtain a training rate of each of the master chip and the slave chip in a phase of equalization training, and continue to perform S1104.

S1103: Respectively configure the sending parameter and the receiving parameter as initial parameters of the master chip and the slave chip in a target phase of a current round of equalization training, and continue to perform S1106.

S1104: Determine a target equalization timeout period corresponding to the training rate, and continue to perform S1105.

S1105: Configure the target equalization timeout period as an equalization timeout period in the target phase, where equalization training in the target phase is performed on the master chip and the slave chip within the equalization timeout period in the target phase.

S1106: Obtain a forward compatible equalization timeout period in a target phase of equalization training, and configure the forward compatible equalization timeout period as an equalization timeout period in the target phase of the current round of equalization training.

S1107: Perform, within the equalization timeout period in the target phase of the current round of equalization training, equalization training by using the initial parameters of the master chip and the slave chip in the target phase of the current round of equalization training.

Figure 11:
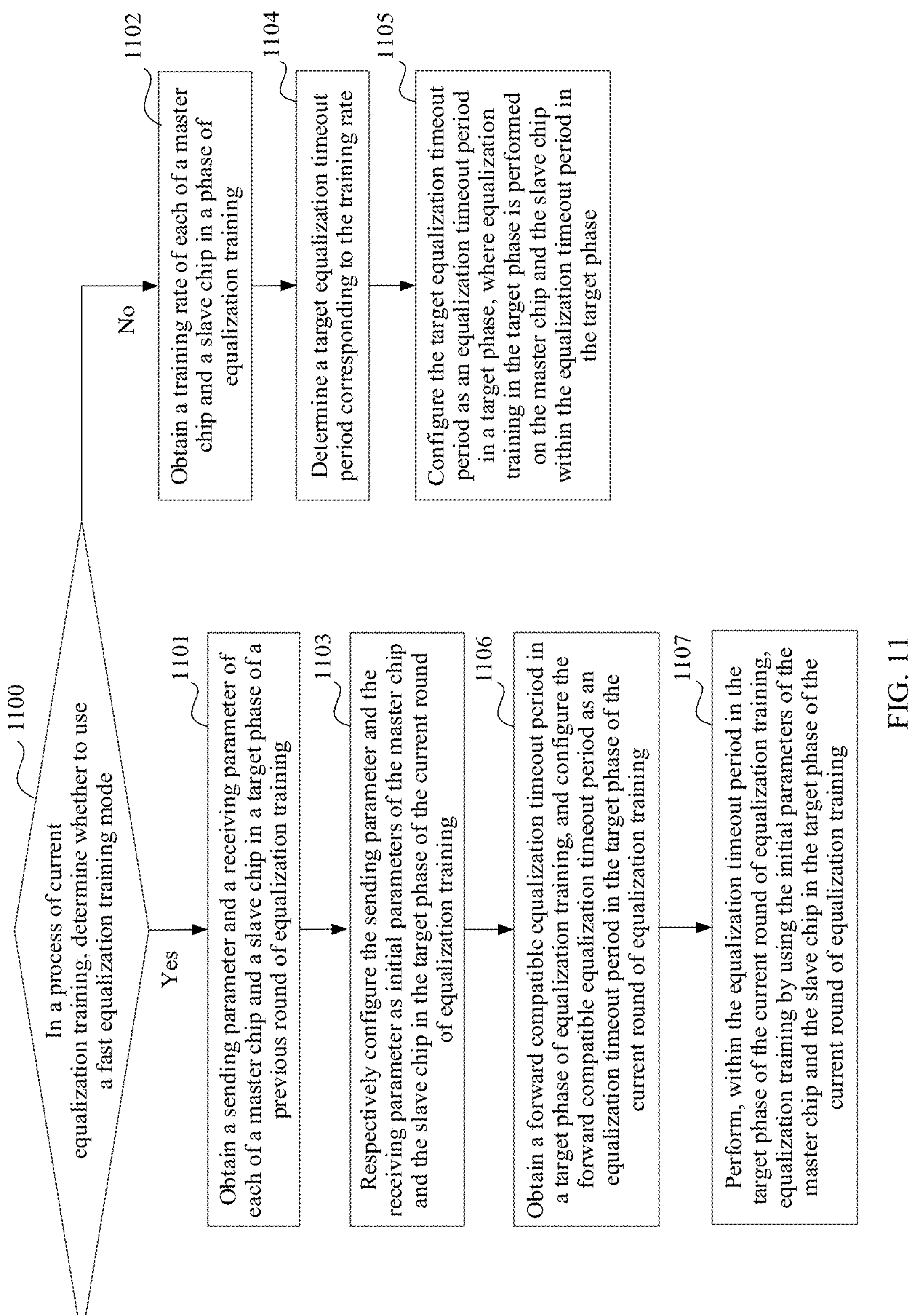
FIG. 11 is a schematic diagram of a third equalization training method according to an embodiment of this application.

It should be noted that, in this embodiment of this application, a combination manner of FIG. 9 and FIG. 10 is not limited to the manner described in FIG. 11, and may be flexibly adjusted based on actual application. For example, after it is determined to use the fast equalization training mode, the target equalization timeout period may still be determined based on the training rate used to perform the target phase of equalization training, to perform equalization training based on the target equalization timeout period and the obtained initial parameter.

Further, in this embodiment of this application, after equalization training is completed in any one of the foregoing manners in FIG. 9 to FIG. 11, a default configuration is restored.

4. This application further provides an equalization training apparatus. The apparatus may be configured to perform the foregoing first equalization training method and/or the foregoing second equalization training method. Therefore, for the apparatus described in this embodiment, refer to related limitations and descriptions in the foregoing method embodiments. For brevity, a same or similar part is not described in this embodiment. It should be noted that the apparatus in this embodiment may be a system management chip.

Figure 12:
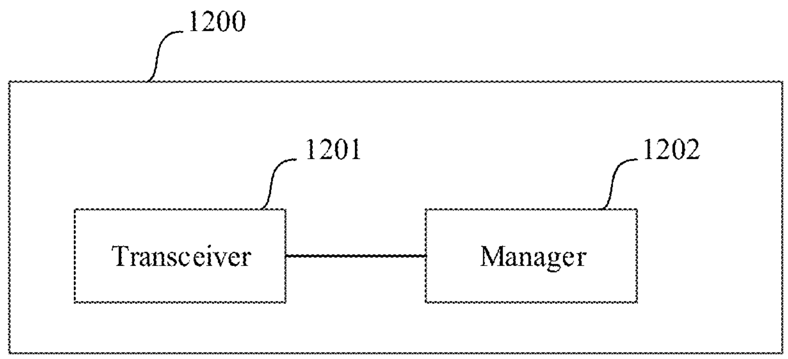
FIG. 12 is a schematic diagram of a first equalization training apparatus according to this application.

FIG. 12 shows an equalization training apparatus 1200 provided in this embodiment. The apparatus 1200 includes a transceiver 1201 and a manager 1202.

When the equalization training apparatus is configured to perform the first equalization training method provided above, details are as follows:

Specifically, the transceiver 1201 is configured to obtain a training rate of each of a master chip and a slave chip in a target phase of equalization training. The target phase is a third phase or a fourth phase. Correspondingly, the manager 1202 is configured to: determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

In an embodiment of this application, when the target rate threshold interval is a threshold interval including a minimum rate in the N+1 rate threshold intervals, the manager 1202 determines the target equalization timeout period as a forward compatible equalization timeout period.

In another embodiment of this application, the correspondence between the N+1 rate threshold intervals and the N+1 equalization timeout periods is prestored in a register of the master chip or in a register of the slave chip.

In still another embodiment of this application, before the training rate of each of the master chip and the slave chip in the target phase of equalization training is obtained, the manager 1202 is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

In still another embodiment of this application, after equalization training in a target phase of a current round of equalization training is completed, the manager 1202 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In still another embodiment of this application, the manager 1202 is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

When the equalization training apparatus is configured to perform the second equalization training method provided above, details are as follows:

Specifically, the manager 1202 is configured to determine whether to use a fast equalization training mode. Correspondingly, the transceiver 1201 is configured to: when it is determined to use the fast equalization training mode, obtain a sending parameter and a receiving parameter of each of a master chip and a slave chip in a target phase of a previous round of equalization training.

The manager is further configured to respectively configure the sending parameter and the receiving parameter as initial parameters of the master chip and the slave chip in a target phase of a current round of equalization training, where a target phase of equalization training is a third phase or a fourth phase of the equalization training. The transceiver is further configured to obtain a forward compatible equalization timeout period in the target phase of equalization training. The manager is further configured to configure the forward compatible equalization timeout period as an equalization timeout period in the target phase of the current round of equalization training. The manager is further configured to perform, within the equalization timeout period in the target phase of the current round of equalization training, equalization training by using the initial parameters of the master chip and the slave chip in the target phase of the current round of equalization training.

In an embodiment of this application, after equalization training in the target phase of the current round of equalization training is completed, the manager 1202 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In an embodiment of this application, before it is determined to use the fast equalization training mode, the transceiver 1201 is further configured to obtain a negotiation sequence that is of the master chip and the slave chip and that is used for the target phase of equalization training; and the manager 1202 is further configured to determine, based on a correspondence between a bit value specified in the negotiation sequence and an equalization training mode, that a bit value specified in the negotiation sequence corresponds to a non-fast equalization training mode.

5. This application further provides a second equalization training apparatus. The apparatus may also be configured to perform the foregoing first equalization training method for configuring an equalization timeout period and/or the foregoing second equalization training method. Therefore, for the apparatus in this embodiment, refer to related limitations and descriptions in the foregoing method embodiments. It should be noted that the apparatus in this embodiment may be a BIOS.

Figure 13:
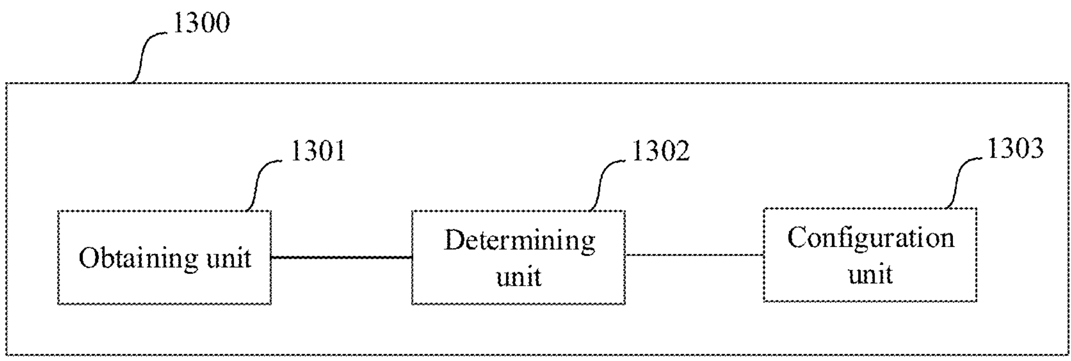
FIG. 13 is a schematic diagram of a second equalization training apparatus according to this application.

FIG. 13 shows an equalization training apparatus 1300 provided in this embodiment. The apparatus includes an obtaining unit 1301, a determining unit 1302, and a configuration unit 1303.

When the equalization training apparatus is configured to perform the first equalization training method provided above, details are as follows:

The obtaining unit 1301 is configured to obtain a training rate of each of a master chip and a slave chip in a target phase of equalization training, where the target phase is a third phase or a fourth phase.

Correspondingly, the determining unit 1302 is configured to: determine a target rate threshold interval within which the training rate in the target phase falls, and determine, based on a correspondence between N+1 rate threshold intervals and N+1 equalization timeout periods, a target equalization timeout period corresponding to the target rate threshold interval.

Further, the configuration unit 1303 is configured to: configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase. In an embodiment of this application, when the target rate threshold interval is a threshold interval including a minimum rate in the N+1 rate threshold intervals, the target equalization timeout period is a forward compatible equalization timeout period.

In another embodiment of this application, before the training rate of each of the master chip and the slave chip in the target phase of equalization training is obtained, the determining unit 1302 is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

In still another embodiment of this application, the obtaining unit 1301 is further configured to: after equalization training in a target phase of a current round of equalization training is completed, store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In still another embodiment of this application, the obtaining unit 1301 is further configured to obtain a negotiation sequence that is of the master chip and the slave chip and that is used for the target phase of equalization training; and the determining unit is further configured to determine, based on a correspondence between a bit value specified in the negotiation sequence and an equalization training mode, that a bit value specified in the negotiation sequence corresponds to a non-fast equalization training mode.

When the equalization training apparatus is configured to perform the second equalization training method provided above, details are as follows:

The determining unit 1302 is configured to determine whether to use a fast equalization training mode.

Correspondingly, the obtaining unit 1301 is configured to: when it is determined to use the fast equalization training mode, obtain a sending parameter and a receiving parameter of each of a master chip and a slave chip in a target phase of a previous round of equalization training.

The configuration unit 1303 is configured to respectively configure the sending parameter and the receiving parameter as initial parameters of the master chip and the slave chip in a target phase of a current round of equalization training, where a target phase of equalization training is a third phase or a fourth phase of the equalization training.

Further, the obtaining unit 1301 is further configured to obtain a forward compatible equalization timeout period in the target phase of equalization training.

The configuration unit 1303 is further configured to: configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

In still another embodiment of this application, the obtaining unit 1301 is further configured to: after equalization training in a target phase of a current round of equalization training is completed, store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In still another embodiment of this application, before it is determined to use the fast equalization training mode, the obtaining unit 1301 is further configured to obtain a negotiation sequence that is of the master chip and the slave chip and that is used for the target phase of equalization training; and the determining unit 1302 is further configured to determine, based on a correspondence between a bit value specified in the negotiation sequence and an equalization training mode, that a bit value specified in the negotiation sequence corresponds to a non-fast equalization training mode.

6. This application further provides a third equalization training apparatus. The apparatus may also be configured to perform the foregoing first equalization training method for configuring an equalization timeout period and/or the foregoing second equalization training method. Correspondingly, for the apparatus, refer to related limitations in the foregoing method embodiments. A same or similar part is not described again in this embodiment.

Figure 14:
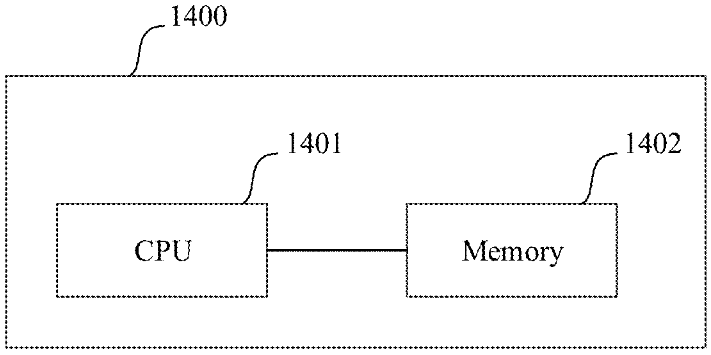
FIG. 14 is a schematic diagram of still another equalization training apparatus according to this application.

FIG. 14 shows an equalization training apparatus 1400 provided in this embodiment. The apparatus 1400 includes a central processing unit 1401 and a memory 1402. The memory 1402 is configured to store code, and the CPU 1401 is configured to execute the code stored in the memory 1402, to implement a function of the apparatus in this embodiment. It should be understood that the CPU is a CPU of a processor system to which a PCIe bus is applied.

When the equalization training apparatus is configured to perform the first equalization training method provided above, details are as follows:

Specifically, the memory 1402 is further configured to store a correspondence between N+1 rate threshold intervals and N+1 equalization timeout periods. The CPU 1401 is configured to obtain a training rate of each of a master chip and a slave chip in a target phase of equalization training. The target phase is a third phase or a fourth phase.

The CPU 1401 is further configured to: determine a target rate threshold interval within which the training rate in the target phase falls, determine, based on the correspondence between the N+1 rate threshold intervals and the N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

In an embodiment of this application, the correspondence between the N+1 rate threshold intervals and the N+1 equalization timeout periods is prestored in a register of the master chip or in a register of the slave chip.

In another embodiment of this application, before the training rate of each of the master chip and the slave chip in the target phase of equalization training is obtained, the CPU 1401 is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

In still another embodiment of this application, after equalization training in a target phase of a current round of equalization training is completed, the CPU 1401 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In still another embodiment of this application, the CPU 1401 is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

When the equalization training apparatus is configured to perform the second equalization training method provided above, details are as follows:

Specifically, the memory 1402 is further configured to store an equalization parameter in a target phase of a previous round of equalization training. The CPU 1401 is configured to: determine whether to use a fast equalization training mode, and when determining to use the fast equalization training mode, obtain a sending parameter and a receiving parameter of each of a master chip and a slave chip in the target phase of the previous round of equalization training, and respectively configure the sending parameter and the receiving parameter as initial parameters of the master chip and the slave chip in a target phase of a current round of equalization training, where a target phase of equalization training is a third phase or a fourth phase of the equalization training.

The CPU 1401 is further configured to: obtain a forward compatible equalization timeout period in the target phase of equalization training, and configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

In an embodiment of this application, after equalization training in a target phase of a current round of equalization training is completed, the CPU 1401 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In an embodiment of this application, before it is determined to use the fast equalization training mode, the CPU 1401 is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

Figure 15:
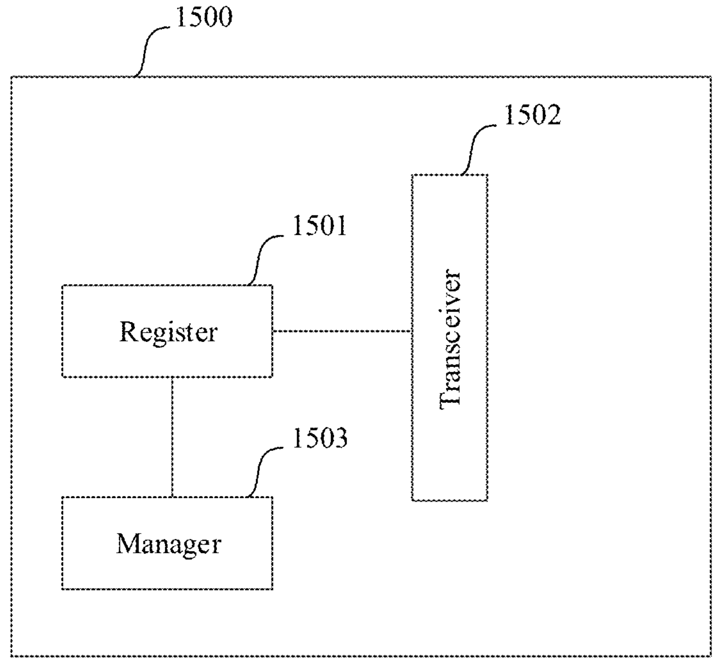
FIG. 15 is a schematic diagram of a structure of a chip according to this application.

7. This application further provides a chip. The chip is the master chip or the slave chip described in the foregoing embodiments. FIG. 15 shows a chip 1500 provided in this application. The chip 1500 includes a register 1501, a transceiver 1502, and a manager 1503.

When the chip is configured to perform the first equalization training method provided above, details are as follows:

The register 1501 is configured to store a correspondence between N+1 rate threshold intervals and N+1 equalization timeout periods.

The transceiver 1502 is configured to obtain a training rate of each of a master chip and a slave chip in a target phase of equalization training. The target phase is a third phase or a fourth phase.

The manager 1503 is configured to: determine a target rate threshold interval within which the training rate in the target phase falls, determine, based on the correspondence between the N+1 rate threshold intervals and the N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

When the chip is configured to perform the second equalization training method provided above, details are as follows:

The register 1501 is configured to store an equalization parameter in a target phase of a current round of equalization training of the chip.

The manager 1503 is configured to determine whether to use a fast equalization training mode.

The transceiver 1502 is configured to: when it is determined to use the fast equalization training mode, obtain a sending parameter and a receiving parameter of each of a master chip and a slave chip in a target phase of a previous round of equalization training.

The manager 1503 is further configured to respectively configure the sending parameter and the receiving parameter as initial parameters of the master chip and the slave chip in a target phase of a current round of equalization training, where a target phase of equalization training is a third phase or a fourth phase of the equalization training.

The transceiver 1502 is further configured to obtain a forward compatible equalization timeout period in the target phase of equalization training.

The manager 1503 is further configured to: configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

Further, in this embodiment of this application, the chip has a function of enabling and disabling a part of an equalization circuit. When a fast equalization process is required, a part of the equalization circuit is disabled. For example, a DFE or a part of a CTLE is disabled, to shorten equalization time. The chip in this embodiment of this application is provided with management software, or is a state machine that meets a standard.

Figure 16:
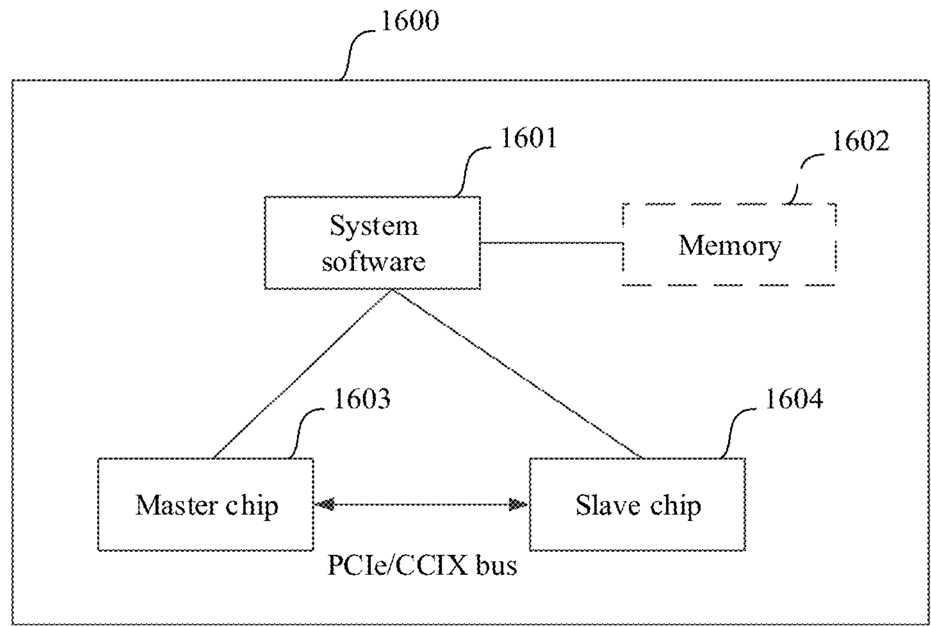
FIG. 16 is a schematic diagram of a structure of a communications system according to this application.

8. FIG. 16 shows a communications system 1600 provided in this application. The communications system 1600 includes system software 1601, a master chip 1603, and a slave chip 1604. The master chip 1603 and the slave chip 1604 are connected to each other by using a PCIe/CCIX bus. It should be noted that the system software 1601 may be a BIOS.

When the communications system is configured to perform the first equalization training method provided above, details are as follows:

Specifically, the system software 1601 is configured to: obtain a training rate of each of a master chip and a slave chip in a target phase of equalization training, where the target phase is a third phase or a fourth phase; determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, where N rate thresholds are predetermined, N is an integer greater than or equal to 0, and a longer rate threshold interval corresponds to a longer equalization timeout period, where equalization training in the target phase is performed on the master chip and the slave chip within the equalization timeout period in the target phase.

It should be noted that the communications system may further include a memory 1602. The memory 1602 is configured to store the correspondence between the N+1 rate threshold intervals and the N+1 equalization timeout periods.

Further, the memory 1602 is further configured to store an equalization parameter in a target phase of a current round of equalization training. In an embodiment of this application, when the target rate threshold interval is a threshold interval including a minimum rate in the N+1 rate threshold intervals, the target equalization timeout period is a forward compatible equalization timeout period.

In an embodiment of this application, the correspondence between the N+1 rate threshold intervals and the N+1 equalization timeout periods is prestored in a register of the master chip or in a register of the slave chip.

In an embodiment of this application, before the training rate of each of the master chip and the slave chip in the target phase of equalization training is obtained, the system software 1601 is further configured to determine not to use a fast equalization training mode. The fast equalization training mode is a mode in which initial parameters of the master chip and the slave chip in a target phase of a current round of equalization training are separately configured based on a sending parameter and a receiving parameter in a target phase of a previous round of equalization training.

In an embodiment of this application, after equalization training in a target phase of a current round of equalization training is completed, the system software 1601 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In an embodiment of this application, the system software 1601 is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

When the communications system is configured to perform the second equalization training method provided above, details are as follows:

Specifically, the system software 1601 is configured to: determine whether to use a fast equalization training mode; when it is determined to use the fast equalization training mode, obtain a sending parameter and a receiving parameter of each of a master chip and a slave chip in a target phase of a previous round of equalization training, and respectively configure the sending parameter and the receiving parameter as initial parameters of the master chip and the slave chip in a target phase of a current round of equalization training, where a target phase of equalization training is a third phase or a fourth phase of the equalization training; obtain a forward compatible equalization timeout period in the target phase of equalization training, and configure the forward compatible equalization timeout period as an equalization timeout period in the target phase of the current round of equalization training; and perform, within the equalization timeout period in the target phase of the current round of equalization training, equalization training by using the initial parameters of the master chip and the slave chip in the target phase of the current round of equalization training.

It should be noted that the communications system may further include a memory 1602. The memory 1602 is configured to store an equalization parameter in a target phase of a previous round of equalization training.

Further, the memory 1602 is further configured to store an equalization parameter in the target phase of the current round of equalization training.

Further, the memory 1602 is configured to store a correspondence between N+1 rate threshold intervals and N+1 equalization timeout periods.

In an embodiment of this application, after equalization training in a target phase of a current round of equalization training is completed, the system software 1601 is further configured to: store, in a register of the master chip, an equalization parameter of the master chip in the target phase of the current round of equalization training, and store, in a register of the slave chip, an equalization parameter of the slave chip in the target phase of the current round of equalization training; or store, in a register of the master chip, equalization parameters of the master chip and the slave chip in the target phase of the current round of equalization training; or store, in a register of the slave chip, equalization parameters of the master chip and the slave chip in the target phase of the current round of equalization training.

In an embodiment of this application, before it is determined to use the fast equalization training mode, the system software 1601 is further configured to: obtain a negotiation sequence that is of the master chip and the slave chip and that is used for the target phase of equalization training; and determine, based on a correspondence between a bit value specified in the negotiation sequence and an equalization training mode, that a bit value specified in the negotiation sequence corresponds to a non-fast equalization training mode.

It should be noted that, for the foregoing apparatus, chip, and communications system, refer to the related descriptions in the method embodiment. Because of singularity of subjects protected by this application, descriptions of these subjects have a plurality of same or similar parts. For brevity, in this application file, the method embodiments are comprehensively and fully described, and all the other embodiments are relatively briefly described.

In some possible embodiments, aspects of the equalization training method provided in the embodiments of this application may alternatively be implemented in a form of a program product, and the program product includes program code. When the program code is run on a computer device, the program code is used to enable the computer device to perform the operations in the equalization training method described in this specification according to various example embodiments of this application.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium in this embodiment of this application include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

A program product for equalization training in an embodiment of this application may use a portable compact disc read-only memory (CD-ROM) and include program code, and may run on a server device. However, the program product in this application is not limited thereto. In this specification, the readable storage medium may be any tangible medium including or storing a program. The program may be transmitted as a message, or used by or in combination with an apparatus or a device.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of this application may be written in any combination of one or more program design languages. The program design languages include object-oriented program design languages such as Java and C++, and further include a conventional procedural program design language such as a "C" language or a similar program design language. The program code may be completely executed on a user's computing device, partially executed on user equipment, executed as an independent software package, partially executed on a user's computing device and partially executed on a remote computing device, or completely executed on a remote computing device or server. When the program code is executed on the remote computing device, the remote computing device may be connected to the user's computing device by using any type of network, including a local area network (LAN) or a wide area network (WAN), or may be connected to an external computing device.

For the equalization training method, the embodiments of this application further provide a computing device readable storage medium, so that content is not lost after a power failure. The storage medium stores a software program, including program code. When the program code is run on a computing device, and when the software program is read and executed by one or more processors, any solution of performing training in an equalization timeout period in the embodiments of this application may be implemented.

The foregoing describes this application with reference to the block diagrams and/or flowcharts of the method, the apparatus (e.g., system), and/or the computer program product in the embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a special-purpose computer, or another programmable data processing apparatus to produce a machine, so that the instructions executed by the processor of the computer or the another programmable data processing apparatus create a method for implementing a specific function/action in a block in the block diagrams and/or flowcharts.

Correspondingly, this application may alternatively be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, so that the computer-usable or computer-readable medium is used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. An equalization training method, comprising:

obtaining a training rate of each of a downstream port and an upstream port in a target phase of equalization training, wherein the target phase is a third phase or a fourth phase of phases of the equalization training; and determining a target rate threshold interval within which the training rate in the target phase falls, determining, based on a correspondence between N+1 rate threshold intervals and N+1 equalization timeout periods, a target equalization timeout period corresponding to the target rate threshold interval, and configuring the target equalization timeout period as an equalization timeout period in the target phase, wherein N rate thresholds are predetermined, N is an integer greater than or equal to 0, and a longer rate threshold interval corresponds to a longer equalization timeout period, wherein equalization training in the target phase is performed on the downstream port and the upstream port within the equalization timeout period in the target phase.

2. The method according to claim 1, wherein when the target rate threshold interval is a threshold interval comprising a minimum rate in the N+1 rate threshold intervals, the target equalization timeout period is a forward compatible equalization timeout period.

3. The method according to claim 1, wherein the correspondence between the N+1 rate threshold intervals and the N+1 equalization timeout periods is prestored in a register of the downstream port or in a register of the upstream port.

4. The method according to claim 1, wherein the downstream port and the upstream port are connected through a peripheral component interconnect express (PCIe) bus or a cache coherent interconnect for accelerators (CCIX) bus, the downstream port is a root complex or a switch chip, and the upstream port is an endpoint device independent of the downstream port.

5. An equalization training apparatus, comprising:

a transceiver, configured to obtain a training rate of each of a downstream port and an upstream port in a target phase of equalization training, wherein the target phase is a third phase or a fourth phase of phases of the equalization training; and at least one processor, coupled with the transceiver, configured to: determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, wherein N rate thresholds are predetermined, N is an integer greater than or equal to 0, and a longer rate threshold interval corresponds to a longer equalization timeout period, wherein equalization training in the target phase is performed on the downstream port and the upstream port within the equalization timeout period in the target phase.

6. The apparatus according to claim 5, wherein when the target rate threshold interval is a threshold interval comprising a minimum rate in the N+1 rate threshold intervals, the target equalization timeout period is a forward compatible equalization timeout period.

7. The apparatus according to claim 5, wherein the correspondence between the N+1 rate threshold intervals and the N+1 equalization timeout periods is prestored in a register of the downstream port or in a register of the upstream port.

8. The apparatus according to claim 5, wherein the downstream port and the upstream port are connected through a peripheral component interconnect express (PCIe) bus or a cache coherent interconnect for accelerators (CCIX) bus, the downstream port is a root complex or a switch chip, and the upstream port is an endpoint device independent of the downstream port.

9. A chip, comprising:

a register, configured to store a correspondence between N+1 rate threshold intervals and N+1 equalization timeout periods;

a transceiver, configured to obtain a training rate of each of a downstream port and an upstream port in a target phase of equalization training, wherein the target phase is a third phase or a fourth phase of phases of the equalization training; and at least one processor, coupled with the transceiver, configured to: determine a target rate threshold interval within which the training rate in the target phase falls, determine, based on the correspondence between the N+1 rate threshold intervals and the N+1 equalization timeout periods, a target equalization timeout period corresponding to the target rate threshold interval, and configure the target equalization timeout period as an equalization timeout period in the target phase, wherein N rate thresholds are predetermined, N is an integer greater than or equal to 0, and a longer rate threshold interval corresponds to a longer equalization timeout period, wherein equalization training in the target phase is performed on the downstream port and the upstream port within the equalization timeout period in the target phase.

10. The chip according to claim 9, wherein when the target rate threshold interval is a threshold interval comprising a minimum rate in the N+1 rate threshold intervals, the target equalization timeout period is a forward compatible equalization timeout period.

11. The chip according to claim 9, wherein the correspondence between the N+1 rate threshold intervals and the N+1 equalization timeout periods is prestored in a register of the downstream port or in a register of the upstream port.

12. A communications system, comprising:

a processing system configured to execute a system software stored in a memory of the communications system;

a downstream port;

an upstream port;

wherein the downstream port and the upstream port are connected to each other through a peripheral component interconnect express (PCIe) bus or a cache coherent interconnect for accelerators (CCIX) bus; and wherein the processing system accesses the system software in the memory and executes the system software to configure the communications system to:

obtain a training rate of each of the downstream port and the upstream port in a target phase of equalization training, wherein the target phase is a third phase or a fourth phase; and determine a target rate threshold interval within which the training rate in the target phase falls, determine, based on a correspondence between N+1 rate threshold intervals and N+1 equalization timeout periods, a target equalization timeout period corresponding to the target rate threshold interval, and configure the target equalization timeout period as an equalization timeout period in the target phase, wherein N rate thresholds are predetermined, N is an integer greater than or equal to 0, and a longer rate threshold interval corresponds to a longer equalization timeout period, wherein equalization training in the target phase is performed on the downstream port and the upstream port within the equalization timeout period in the target phase.

13. The communications system according to claim 12, further comprising:

the memory, configured to store the correspondence between the N+1 rate threshold intervals and the N+1 equalization timeout periods.

14. The communications system according to claim 12, wherein when the target rate threshold interval is a threshold interval comprising a minimum rate in the N+1 rate threshold intervals, the target equalization timeout period is a forward compatible equalization timeout period.

* * * * *